US011272459B2

(12) United States Patent
Huang et al.

(10) Patent No.: US 11,272,459 B2
(45) Date of Patent: Mar. 8, 2022

(54) POWER CONTROL FOR WIRELESS DEVICE COOPERATIVE TRANSMISSION SCHEMES

(71) Applicant: QUALCOMM Incorporated, San Diego, CA (US)

(72) Inventors: Yi Huang, San Diego, CA (US); Prashanth Haridas Hande, San Diego, CA (US); Jay Kumar Sundararajan, San Diego, CA (US); Gokul Sridharan, Sunnyvale, CA (US); Wei Yang, San Diego, CA (US); Wanshi Chen, San Diego, CA (US); Krishna Kiran Mukkavilli, San Diego, CA (US); Allen Minh-Triet Tran, Rancho Santa Fe, CA (US); Joseph Patrick Burke, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/066,644

(22) Filed: Oct. 9, 2020

(65) Prior Publication Data

US 2021/0144648 A1 May 13, 2021

Related U.S. Application Data

(60) Provisional application No. 62/932,348, filed on Nov. 7, 2019.

(51) Int. Cl.
*H04W 52/14* (2009.01)
*H04W 52/36* (2009.01)
*H04W 52/54* (2009.01)

(52) U.S. Cl.
CPC ....... *H04W 52/146* (2013.01); *H04W 52/367* (2013.01); *H04W 52/54* (2013.01)

(58) Field of Classification Search
CPC .. H04B 7/0413; H04W 52/146; H04W 52/54; H04W 52/367

(Continued)

(56) References Cited

U.S. PATENT DOCUMENTS 4,636,741 A * 1/1987 Mitzlaff ................ H03F 1/0222
　　　　　　　　　　　　　　　　　　　330/127
8,290,082 B2 * 10/2012 Vasil'Evich ......... H04B 7/0452
　　　　　　　　　　　　　　　　　　　375/267

(Continued)

OTHER PUBLICATIONS

Apple: "R17 Enhancement for Wearables," 3GPP Draft, 3GPP TSG RAN Meeting #85, RP-192173, R17 Enhancement for Wearables, 3RD Generation Partnership Project (3GPP), Mobile Competence Centre, 650, Route Des Lucioles, F-06921, Sophia-Antipolis Cedex, France, vol. TSG RAN, No. Newport Beach, USA, Sep. 16,2019-Sep. 20, 2019, Sep. 9, 2019 (Sep. 9, 2019), XP051782723, 4 pages, Retrieved from the Internet: URL: http://www.3gpp.org/ftp/tsg_ran/TSG_RAN/TSGR_85/Docs/RP-192173.zip [retrieved on Sep. 9, 2019] section 3.1 section 3.2 figure 1.

(Continued)

*Primary Examiner* — John J Lee
(74) *Attorney, Agent, or Firm* — Qualcomm Incorporated

(57) ABSTRACT

Generally, the described techniques provide for efficiently transmitting uplink signals to a base station using shared antennas associated with different power classes. A first device may be in communications with a base station using local antennas and may identify a second device having auxiliary antennas available for transmitting uplink signals to the base station. The local and auxiliary antennas may be associated with different power classes, and the first device may transmit a message to a base station indicating that the first device is capable of transmitting using antennas associated with different power classes. The first device may then receive configurations from a base station of different (Continued)

transmit powers to transmit on the antennas associated with the different power classes, and the first device may transmit uplink signals to the base station in accordance with the different transmit power configurations.

30 Claims, 15 Drawing Sheets

(58) Field of Classification Search
USPC ......... 455/66.1, 522, 69, 279.1, 277.1, 67.11
See application file for complete search history.

(56) References Cited

U.S. PATENT DOCUMENTS

| | | | |
|---|---|---|---|
| 10,476,567 B2* | 11/2019 | Wernersson | .......... H04L 5/0048 |
| 2011/0044296 A1* | 2/2011 | Zhang | .................. H04W 52/42 |
| | | | 370/336 |

OTHER PUBLICATIONS

International Search Report and Written Opinion—PCT/US2020/055266—ISA/EPO—dated Jan. 29, 2021.

* cited by examiner

POWER CONTROL FOR WIRELESS DEVICE COOPERATIVE TRANSMISSION SCHEMES

CROSS REFERENCE

The present Application for patent claims the benefit of U.S. Provisional Patent Application No. 62/932,348 by HUANG et al., entitled "POWER CONTROL FOR WIRELESS DEVICE COOPERATIVE TRANSMISSION SCHEMES," filed Nov. 7, 2019, assigned to the assignee hereof, and expressly incorporated by reference herein.

BACKGROUND

The following relates generally to wireless communications and more specifically to power control for wireless device cooperative transmission schemes.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipments (UEs). In some wireless communications systems, an extended reality (XR) device (or other device) may connect to another device, such as a UE, using one of a number of tether options, including a universal serial bus (USB) link, a Bluetooth link, a Wi-Fi link, a 5G sidelink, etc. In such systems, it may be appropriate for both devices to communicate with a base station while the devices are connected to each other. Improved techniques for facilitating communications between connected devices and a base station may be desirable.

SUMMARY

The described techniques relate to improved methods, systems, devices, and apparatuses that support power control for wireless device cooperative transmission schemes. Generally, the described techniques provide for efficiently transmitting uplink signals to a base station using shared antennas associated with different power classes. A first device may be in communication with a base station using local antennas and may identify a second device having auxiliary antennas available for transmitting uplink signals to the base station. The first device may determine that the auxiliary antennas are associated with a different power class than the local antennas, and the first device may transmit a message to the base station indicating that the first device is capable of transmitting using antennas associated with different power classes. The first device may then receive configurations from a base station of different transmit powers to transmit on the antennas associated with the different power classes, and the first device may transmit uplink signals to the base station in accordance with the different transmit power configurations.

A method of wireless communication at a first device is described. The method may include communicating with a base station over a first communication link using a set of local antennas associated with a first power class, identifying a set of auxiliary antennas of a second device associated with a second power class for transmitting uplink signals to the base station, where the first device is in communication with the second device over a second communication link, transmitting, based on identifying the set of auxiliary antennas of the second device, an indication of the second power class for the set of auxiliary antennas to the base station, identifying uplink signals to transmit to the base station using at least one antenna of the set of local antennas of the first device associated with the first power class or of the set of auxiliary antennas of the second device associated with the second power class, and transmitting the uplink signals to the base station via the at least one antenna.

An apparatus for wireless communication at a first device is described. The apparatus may include a processor, memory coupled with the processor, and instructions stored in the memory. The instructions may be executable by the processor to cause the apparatus to communicate with a base station over a first communication link using a set of local antennas associated with a first power class, identify a set of auxiliary antennas of a second device associated with a second power class for transmitting uplink signals to the base station, where the first device is in communication with the second device over a second communication link, transmit, based on identifying the set of auxiliary antennas of the second device, an indication of the second power class for the set of auxiliary antennas to the base station, identify uplink signals to transmit to the base station using at least one antenna of the set of local antennas of the first device associated with the first power class or of the set of auxiliary antennas of the second device associated with the second power class, and transmit the uplink signals to the base station via the at least one antenna.

Another apparatus for wireless communication at a first device is described. The apparatus may include means for communicating with a base station over a first communication link using a set of local antennas associated with a first power class, identifying a set of auxiliary antennas of a second device associated with a second power class for transmitting uplink signals to the base station, where the first device is in communication with the second device over a second communication link, transmitting, based on identifying the set of auxiliary antennas of the second device, an indication of the second power class for the set of auxiliary antennas to the base station, identifying uplink signals to transmit to the base station using at least one antenna of the set of local antennas of the first device associated with the first power class or of the set of auxiliary antennas of the second device associated with the second power class, and transmitting the uplink signals to the base station via the at least one antenna.

A non-transitory computer-readable medium storing code for wireless communication at a first device is described. The code may include instructions executable by a processor to communicate with a base station over a first communication link using a set of local antennas associated with a first power class, identify a set of auxiliary antennas of a second device associated with a second power class for transmitting uplink signals to the base station, where the first device is in communication with the second device over a second communication link, transmit, based on identifying the set of auxiliary antennas of the second device, an indication of the second power class for the set of auxiliary antennas to the base station, identify uplink signals to transmit to the base station using at least one antenna of the set of local antennas of the first device associated with the first power class or of the set of auxiliary antennas of the second device associated with the second power class, and transmit the uplink signals to the base station via the at least one antenna.

Some examples of the method, apparatuses, and non-transitory computer-readable medium described herein may further include operations, features, means, or instructions for receiving, from the base station, a first power control command associated with transmitting the uplink signals via the set of local antennas of the first device and a second power control command associated with transmitting the uplink signals via the set of auxiliary antennas of the second device. In some examples of the method, apparatuses, and non-transitory computer-readable medium described herein, transmitting the uplink signals may include operations, features, means, or instructions for transmitting a first component signal of the uplink signals to the base station via the at least one antenna of the set of local antennas of the first device based on a first power control loop associated with the set of local antennas of the first device and the first power control command, and transmitting a second component signal of the uplink signals to the base station via the at least one antenna of the set of auxiliary antennas of the second device based on a second power control loop associated with the set of auxiliary antennas of the second device and the second power control command.

Some examples of the method, apparatuses, and non-transitory computer-readable medium described herein may further include operations, features, means, or instructions for transmitting, to the second device over the second communication link, a control message indicating a transmit power for transmitting the uplink signals via the set of auxiliary antennas of the second device. In some examples of the method, apparatuses, and non-transitory computer-readable medium described herein, transmitting the uplink signals via the at least one antenna of the set of auxiliary antennas of the second device may include operations, features, means, or instructions for sending in-phase and quadrature samples of the uplink signals to the second device for transmission to the base station via the at least one antenna of the set of auxiliary antennas of the second device. In some examples of the method, apparatuses, and non-transitory computer-readable medium described herein, the in-phase and quadrature samples may be compressed.

In some examples of the method, apparatuses, and non-transitory computer-readable medium described herein, the first power class may be applied to antenna ports of the first device associated with the set of local antennas, and the second power class may be applied to antenna ports of the second device associated with the set of auxiliary antennas. In some examples of the method, apparatuses, and non-transitory computer-readable medium described herein, the first power class may be applied to a first set of carriers allocated for uplink transmissions from the first device using the set of local antennas, and the second power class may be applied to a second set of carriers allocated for uplink transmissions from the second device using the set of auxiliary antennas. Some examples of the method, apparatuses, and non-transitory computer-readable medium described herein may further include operations, features, means, or instructions for receiving RRC signaling indicating a first maximum power reduction and a first maximum allowed power ($P_{EMAX}$) associated with the first power class and a second maximum power reduction and a second maximum allowed power ($P_{EMAX}$) associated with the second power class.

In some examples of the method, apparatuses, and non-transitory computer-readable medium described herein, the first device may be capable of supporting a set of power classes including the first power class and the second power class. In some examples of the method, apparatuses, and non-transitory computer-readable medium described herein, the second communication link includes a universal serial bus (USB) link, a Bluetooth link, a Wi-Fi link, or a sidelink. In some examples of the method, apparatuses, and non-transitory computer-readable medium described herein, the first device may be a UE, a head mounted display, or a wearable device, and the second device may be a UE, a head mounted display, or a wearable device, where the head mounted display includes an extended reality head mounted display, an augmented reality head mounted display, or a virtual reality head mounted display.

A method of wireless communication at a base station is described. The method may include communicating with a first device over a first communication link, the first device using a set of local antennas associated with a first power class, receiving, from the first device, an indication of a second power class associated with a set of auxiliary antennas of a second device, where the first device is in communication with the second device over a second communication link, transmitting, to the first device, a control message indicating a first power for uplink transmissions via the set of local antennas of the first device and a second power for uplink transmissions via the set of auxiliary antennas of the second device, and receiving first uplink signals from the first device transmitted with the first power and second uplink signals from the second device transmitted with the second power based on the transmitting.

An apparatus for wireless communication at a base station is described. The apparatus may include a processor, memory coupled with the processor, and instructions stored in the memory. The instructions may be executable by the processor to cause the apparatus to communicate with a first device over a first communication link, the first device using a set of local antennas associated with a first power class, receive, from the first device, an indication of a second power class associated with a set of auxiliary antennas of a second device, where the first device is in communication with the second device over a second communication link, transmit, to the first device, a control message indicating a first power for uplink transmissions via the set of local antennas of the first device and a second power for uplink transmissions via the set of auxiliary antennas of the second device, and receive first uplink signals from the first device transmitted with the first power and second uplink signals from the second device transmitted with the second power based on the transmitting.

Another apparatus for wireless communication at a base station is described. The apparatus may include means for communicating with a first device over a first communication link, the first device using a set of local antennas associated with a first power class, receiving, from the first device, an indication of a second power class associated with a set of auxiliary antennas of a second device, where the first device is in communication with the second device over a second communication link, transmitting, to the first device, a control message indicating a first power for uplink transmissions via the set of local antennas of the first device and a second power for uplink transmissions via the set of auxiliary antennas of the second device, and receiving first uplink signals from the first device transmitted with the first power and second uplink signals from the second device transmitted with the second power based on the transmitting.

A non-transitory computer-readable medium storing code for wireless communication at a base station is described. The code may include instructions executable by a processor to communicate with a first device over a first communication link, the first device using a set of local antennas associated with a first power class, receive, from the first device, an indication of a second power class associated with a set of auxiliary antennas of a second device, where the first device is in communication with the second device over a second communication link, transmit, to the first device, a control message indicating a first power for uplink transmissions via the set of local antennas of the first device and a second power for uplink transmissions via the set of auxiliary antennas of the second device, and receive first uplink signals from the first device transmitted with the first power and second uplink signals from the second device transmitted with the second power based on the transmitting.

In some examples of the method, apparatuses, and non-transitory computer-readable medium described herein, the first power class may be applied to antenna ports of the first device associated with the set of local antennas, and the second power class may be applied to antenna ports of the second device associated with the set of auxiliary antennas. Some examples of the method, apparatuses, and non-transitory computer-readable medium described herein may further include operations, features, means, or instructions for identifying a first antenna port index associated with the first uplink signals and a second antenna port index associated with the second uplink signals, and determining that the first uplink signals may be from the first device based on the first antenna port index and the second uplink signals may be from the second device based on the second antenna port index.

In some examples of the method, apparatuses, and non-transitory computer-readable medium described herein, the first power class may be applied to a first set of carriers allocated for uplink transmissions from the first device using the set of local antennas, and the second power class may be applied to a second set of carriers allocated for uplink transmissions from the second device using the set of auxiliary antennas. Some examples of the method, apparatuses, and non-transitory computer-readable medium described herein may further include operations, features, means, or instructions for identifying that the first uplink signals may be received on the first set of carriers and the second uplink signals may be received on the second set of carriers, and determining that the first uplink signals may be from the first device based on the first uplink signals being received on the first set of carriers and the second uplink signals may be from the second device based on the second uplink signals being received on the second set of carriers.

Some examples of the method, apparatuses, and non-transitory computer-readable medium described herein may further include operations, features, means, or instructions for transmitting RRC signaling indicating a first maximum power reduction and a first maximum allowed power ($P_{EMAX}$) associated with the first power class and a second maximum power reduction and a second maximum allowed power ($P_{EMAX}$) associated with the second power class. In some examples of the method, apparatuses, and non-transitory computer-readable medium described herein, the first device may be capable of supporting a set of power classes including the first power class and the second power class. In some examples of the method, apparatuses, and non-transitory computer-readable medium described herein, the second communication link includes a USB link, a Bluetooth link, a Wi-Fi link, or a sidelink. In some examples of the method, apparatuses, and non-transitory computer-readable medium described herein, the first device may be a UE, a head mounted display, or a wearable device, and the second device may be a UE, a head mounted display, or a wearable device, where the head mounted display includes an extended reality head mounted display, an augmented reality head mounted display, or a virtual reality head mounted display.

DETAILED DESCRIPTION

Figure 1:
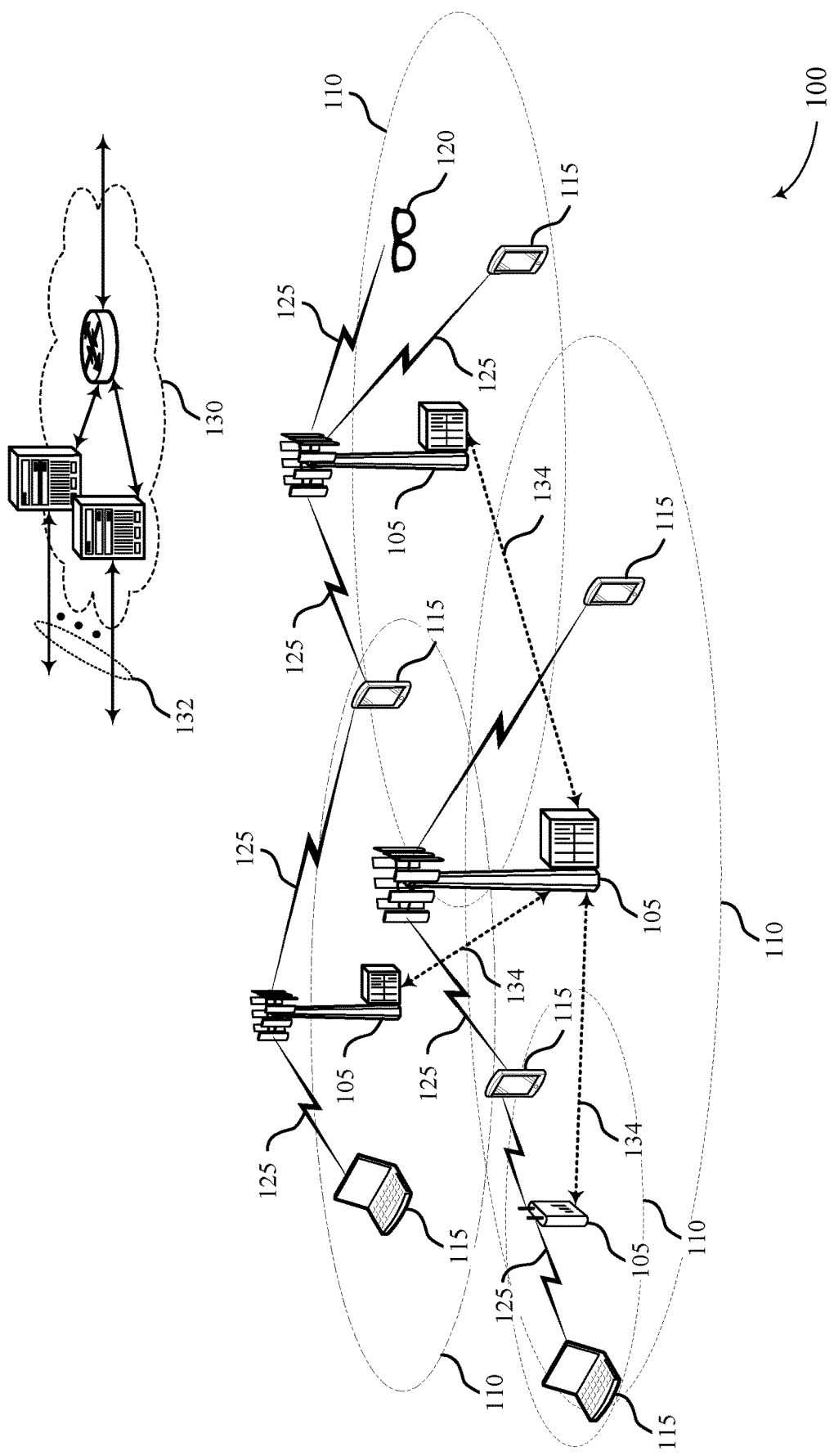
FIG. 1 illustrates an example of a wireless communications system that supports power control for wireless device cooperative transmission schemes in accordance with aspects of the present disclosure.

In some wireless communications systems, a user equipment (UE) may be connected to a base station, and an extended reality (XR) device may be in communication with (e.g., tethered) to the UE. In such systems, the UE may be configured to generate and transmit uplink signals to the base station via one or more local antennas (e.g., physical antennas at the UE) and via one or more auxiliary antennas (e.g., physical antennas at the XR device). Alternatively, if the XR device has a modem, the XR device may be configured to generate and transmit uplink signals to the base station via one or more local antennas (e.g., physical antennas at the XR device) and via one or more auxiliary antennas (e.g., physical antennas at the UE). Thus, in wireless communications systems described herein, a first device may be configured to transmit uplink signals via one or more local antennas at the first device and one or more auxiliary antennas at a second device (e.g., to improve throughput).

In some cases, however, the local antennas at the first device and the auxiliary antennas at the second device may be associated with different power classes, and the first device may be limited to a single power class for transmissions to a base station. For example, the first device may receive a single configuration for a transmit power for transmitting uplink signals to a base station using local antennas and auxiliary antennas. In such cases, if the first device is capable of transmitting at a higher power than the second device (e.g., if the first device has power amplifiers with higher power output than power amplifiers of the second device), transmissions from the first and second devices according to a single configuration may result in loss of throughput. For example, if the single configuration for the transmit power is determined based on the capabilities of the first device, the power of transmissions from the auxiliary antennas may be unexpectedly low resulting in distorted uplink signals and loss of throughput. Alternatively, if the single configuration for the transmit power is determined based on the capabilities of the second device, the power of transmissions from the local antennas may be lower than a supported power, and the first device may not take advantage of the full capacity of the local antennas resulting in loss of throughput.

As described herein, wireless devices may support efficient techniques for transmitting uplink signals to a base station using shared antennas associated with different power classes. In particular, a first device may be configured to transmit on local antennas using a first transmit power and on auxiliary antennas using a second transmit power (e.g., where the power used to transmit on a particular set of antennas may be based on the power classes associated with that set of antennas). Once the first device identifies auxiliary antennas and determines that the auxiliary antennas are associated with a different power class than the local antennas, the first device may transmit a message (e.g., a capability indication) to a base station indicating that the first device is capable of transmitting using antennas associated with different power classes. The first device may then receive configurations from the base station of different transmit powers to transmit on the antennas associated with the different power classes, and the first device may transmit uplink signals to the base station in accordance with the different transmit power configurations.

Aspects of the disclosure introduced above are initially described in the context of a wireless communications system. Examples of processes and signaling exchanges that support power control for wireless device cooperative transmission schemes are then described. Aspects of the disclosure are further illustrated by and described with reference to apparatus diagrams, system diagrams, and flowcharts that relate to power control for wireless device cooperative transmission schemes.

FIG. 1 illustrates an example of a wireless communications system 100 that supports power control for wireless device cooperative transmission schemes in accordance with aspects of the present disclosure. The wireless communications system 100 includes base stations 105, UEs 115, wireless devices 120, and a core network 130. In some examples, the wireless communications system 100 may be a Long-Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 or wireless devices 120 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 and wireless devices 120 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 and wireless devices 120 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 or wireless device 120 to a base station 105, or downlink transmissions from a base station 105 to a UE 115 or wireless device 120. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" may refer to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

UEs 115 or wireless devices 120 may be dispersed throughout the wireless communications system 100, and each UE 115 or wireless device 120 may be stationary or mobile. A UE 115 may also be referred to as a mobile device, a wireless device (i.e., a wireless device 120 may be an example of a UE 115), a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz. Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

Figure 2:
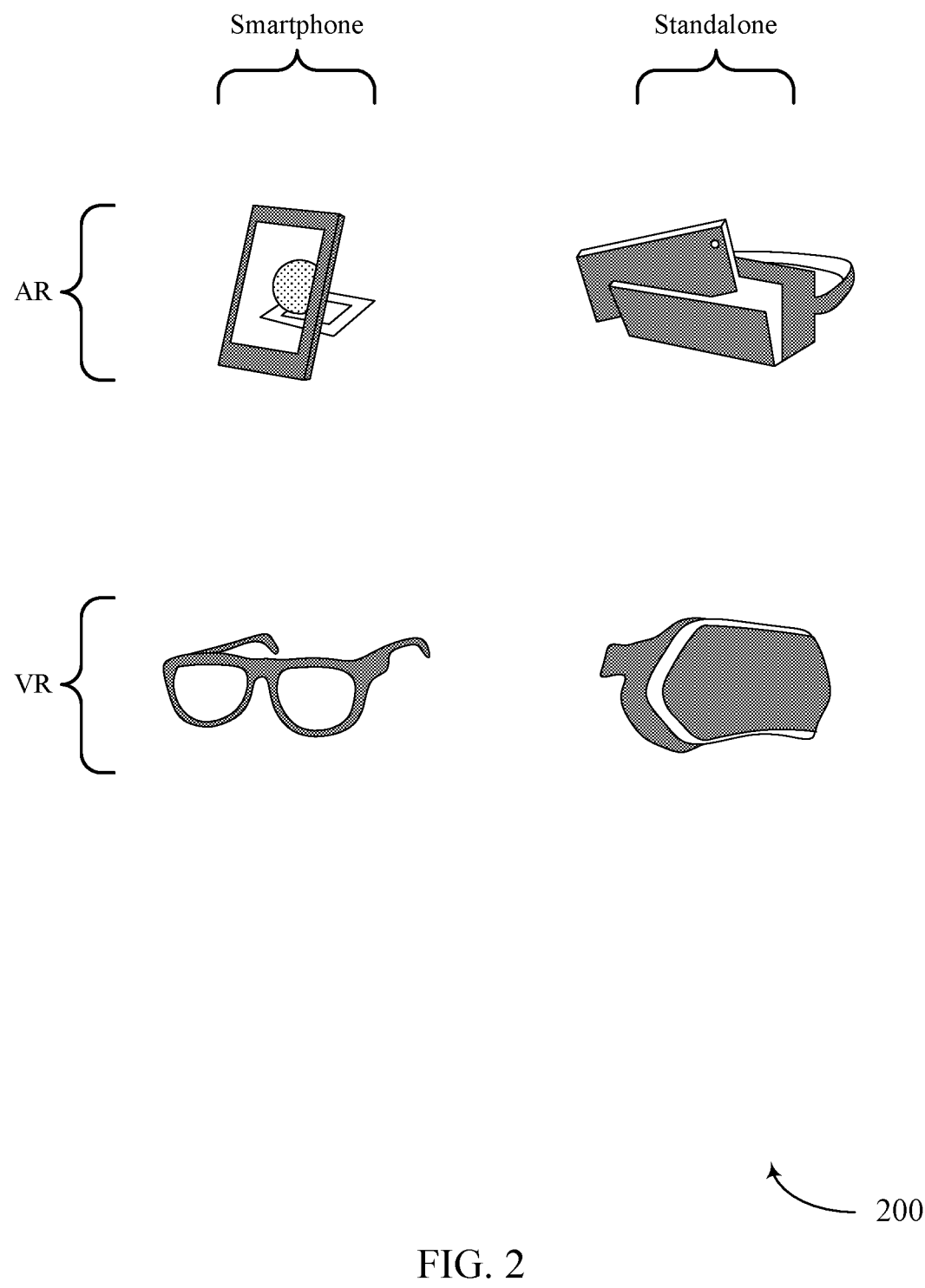
FIG. 2 illustrates an example of AR and VR devices categorized as smartphones or standalone devices in accordance with aspects of the present disclosure.

In wireless communications system 100, a UE 115 may be connected to a base station 105 over a first communication link, and a wireless device 120 may be tethered to the UE 115 over a second communication link. The first communication link may be an example of a link formed upon completion of a successful connection procedure (e.g., RRC connection procedure) between the UE 115 and the base station 105, and the second communication link may be a universal serial bus (USB) link, Bluetooth link, Wi-Fi link, Wi-Fi-D link, or 5G sidelink. The wireless device 120 may be an example of an XR device, an augmented reality (AR) device, a virtual reality (VR) device, a head mounted device (HMD), a wearable device, etc. FIG. 2 illustrates an example of AR and VR devices 200 categorized as smartphones or standalone devices in accordance with aspects of the present disclosure. As described above, these AR and VR devices may be tethered to other smartphones, personal computers (PCs), or consoles (not shown).

In some cases, the form-factor of a wireless device 120 (e.g., an XR HMD) may impose limitations on the number of feasible or accessible antennas on the wireless device 120 available for uplink transmissions. For example, the wireless device 120 may not have room to support more than two antennas for uplink transmissions. Similarly, the form-factor of a UE 115 (e.g., a smartphone) may limit the number of antennas available for uplink transmissions. For instance, it may be challenging to identify antennas for uplink transmissions in an eight-antenna UE 115 design since the antennas at the UE 115 may be used to support a wide range of transmissions, including Wi-Fi, Bluetooth, 5G, 4G, 3G, and other transmissions. As described herein, to improve throughput in wireless communications system 100, the antennas of a wireless device 120 may be used by (or shared with) a UE 115 to support transmissions from the UE 115, or the antennas of a UE 115 may be used by (or shared with) a wireless device 120 to support transmissions from the wireless device 120.

Using antenna sharing, the antennas at a UE 115 and a wireless device 120 may be effectively combined to achieve diversity gain, rank gain, or selection gain. Diversity gain may be achieved since an uplink transmission may be across multiple antennas (e.g., with open-loop linear delay diversity (LDD) and cyclic delay diversity (CDD)), and the antenna sharing may, in some cases, be transparent to the network. Rank gain may be achieved since a device may have access to more antennas and may signal a higher capability to the network. For example, four total antennas may be used for an uplink transmission by a device, where the device has access to two local antennas and two auxiliary antennas at another device. Additionally or alternatively, selection gain may be achieved since a device may be able to select antennas for uplink transmissions (e.g., two antennas) from the total number of local antennas at the device and auxiliary antennas at another device. The diversity and rank gain may also result in uplink signal-to-interference-plus-noise ratio (SINR) gain when the shared antennas are used for transmissions on the same carrier. Further, SINR gain may also be achieved when the shared antennas are used for transmissions on different carriers. In some cases, the antennas at the UE 115 and the wireless device 120 may or may not be time or phase synchronized.

In some aspects, a UE 115 may be configured to generate and transmit uplink signals to a base station 105 via local antennas at the UE 115 and auxiliary antennas at a wireless device 120. Alternatively, if the wireless device 120 has a modem, the wireless device 120 may be configured to generate and transmit uplink signals to the base station via local antennas at the wireless device 120 and auxiliary antennas at the UE 115. Thus, a wireless device 120 may provide additional antennas to a UE 115 for uplink transmissions to a base station 105, or a UE 115 may provide additional antennas to a wireless device 120 for uplink transmission to a base station 105. Local antennas at a first device may refer to physical antennas located at the first device, and auxiliary antennas at a second device may refer to physical antennas located at the second device and available to be shared with or used by the first device for transmissions to a base station 105.

Figure 3:
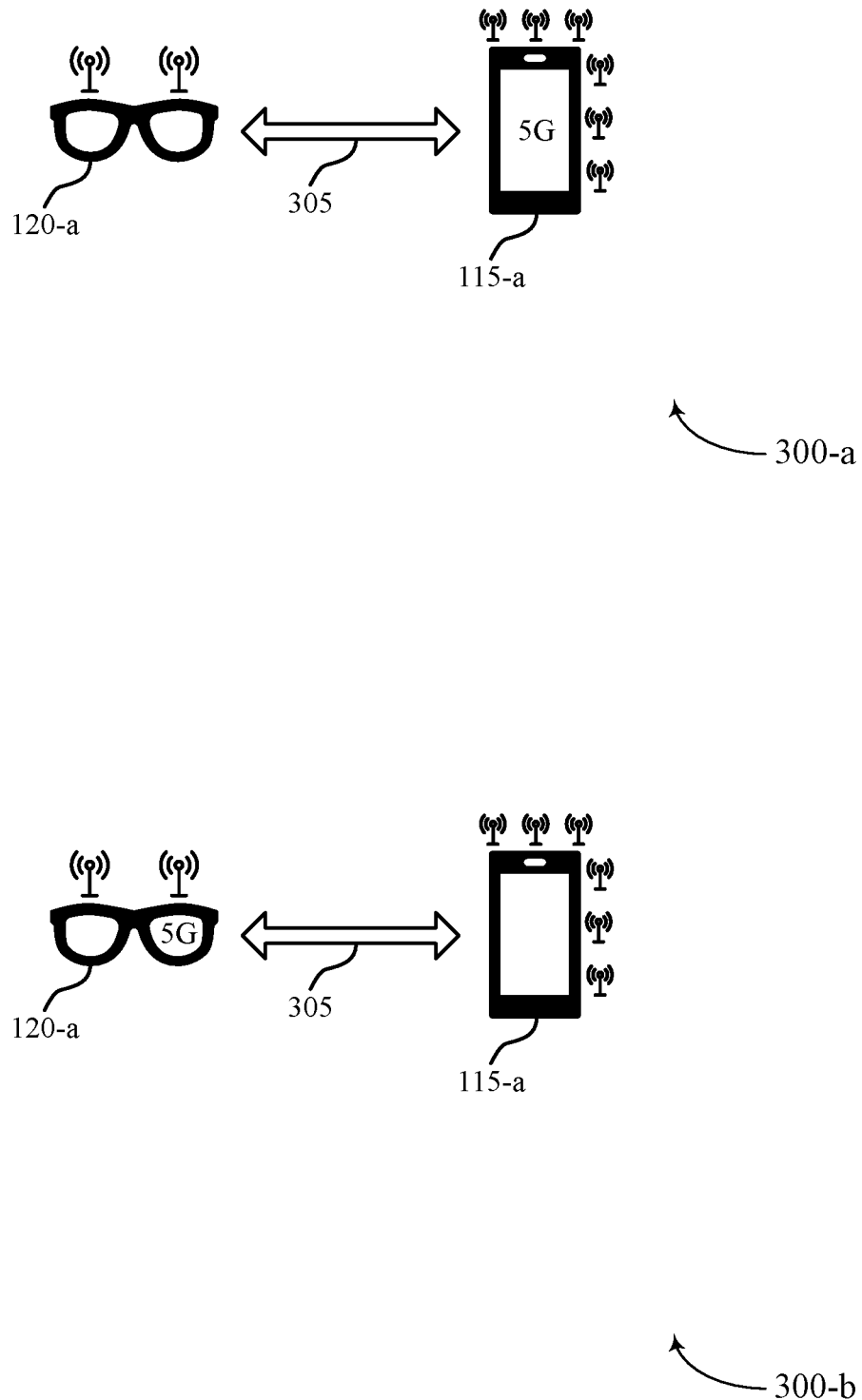
FIG. 3 illustrates an example of antenna sharing in accordance with aspects of the present disclosure.

FIG. 3 illustrates an example of antenna sharing 300 in accordance with aspects of the present disclosure. In the example of FIG. 3, a wireless device 120-a may be tethered to a UE 115-a over a communication link 305 (e.g., a USB link). As shown, the UE 115-a (e.g., 5G phone) may be equipped with six antennas to support up to six layers of uplink transmissions, and an additional two antennas may be provided by the wireless device 120-a. In a first example 300-a, UE 115-a may have a 5G modem, and wireless device 120-a may not have a 5G modem. In this example, the antennas on the wireless device 120-a may be used by the UE 115-a for uplink transmissions to a base station 105 (e.g., the wireless device 120-a may cooperate or share antennas with UE 115-a to improve performance). In a second example 300-b, wireless device 120-a may have a 5G modem (e.g., where the 5G modem at the UE 115-a may or may not be used to generate signals for transmission on shared antennas between the UE 115-a and wireless device 120-a). In this example, the antennas or a subset of the antennas on UE 115-a may be used by the wireless device 120-a for uplink transmissions to a base station 105 (e.g., the UE 115-a may cooperate or share antennas with wireless device 120-a to improve performance).

A device used to generate uplink signals for transmission on local antennas and auxiliary antennas may be referred to as a first device, and a device used to provide auxiliary antennas to the first device may be referred to as a second device. The first device or the second device may be any of a phone, a head mounted display (HMD), a wearable device, an XR device, an AR device, a VR device, etc. The first device may be configured with a modem for generating first uplink signals for transmission to a base station 105 on local antennas and for generating samples of second uplink signals (e.g., in-phase and quadrature (IQ) samples) to send to the second device for transmission to the base station 105 on auxiliary antennas. The second device may be configured with the auxiliary antennas, a power amplifier, a radio frequency (RF) front-end, an analog to digital converter (ADC), a digital to analog converter (DAC), etc., for upconverting and amplifying the samples of the second uplink signals for transmission to a base station 105. In some cases, the first device may compress the samples of the second uplink signals before sending the samples to the second device (e.g., when a high number of antennas is available at the second device, when the size of the samples is large, when the data rate approaches or exceeds the throughput of the tethering option used for the connection between the first and second devices, or when compression may reduce latency between the first device and the second device).

In some cases, even though a first device may be capable of transmitting uplink signals using local antennas and auxiliary antennas, the local antennas and the auxiliary antennas may be associated with different power classes, and the first device may be limited to a single power class for transmissions to a base station 105 using the local antennas and the auxiliary antennas. That is, gains may be limited due to the power differential between local and auxiliary antennas. As an example, the first device may receive a single configuration for a transmit power for transmitting uplink signals to a base station 105 using local antennas and auxiliary antennas. In such cases, if the first device is capable of transmitting at a higher power than the second device (e.g., if the total power dissipation of the second device is limited, or if power amplifiers of the first device are capable of higher power output than power amplifiers of the second device), transmissions from the first and second devices according to a single configuration may result in loss of throughput.

For example, if the single configuration for the transmit power is determined based on the capabilities of the first device, the power of transmissions from the auxiliary antennas may be unexpectedly low, resulting in distorted uplink signals and loss of throughput. Alternatively, if the single configuration for the transmit power is determined based on the capabilities of the second device, the power of transmissions from the local antennas may be lower than a supported power, and the first device may not take advantage of the full capacity of the local antennas resulting in loss of throughput. As described herein, UEs 115 and wireless devices 120 in wireless communications system 100 may support efficient techniques for transmitting uplink signals to a base station 105 using shared antennas associated with different power classes. In some cases, UE 115-b may receive RRC signaling indicating a first maximum power reduction and a first maximum allowed power (e.g., $P_{EMAX}$) associated with a first power class and a second maximum power reduction and a second maximum allowed power associated with a second power class.

Figure 4:
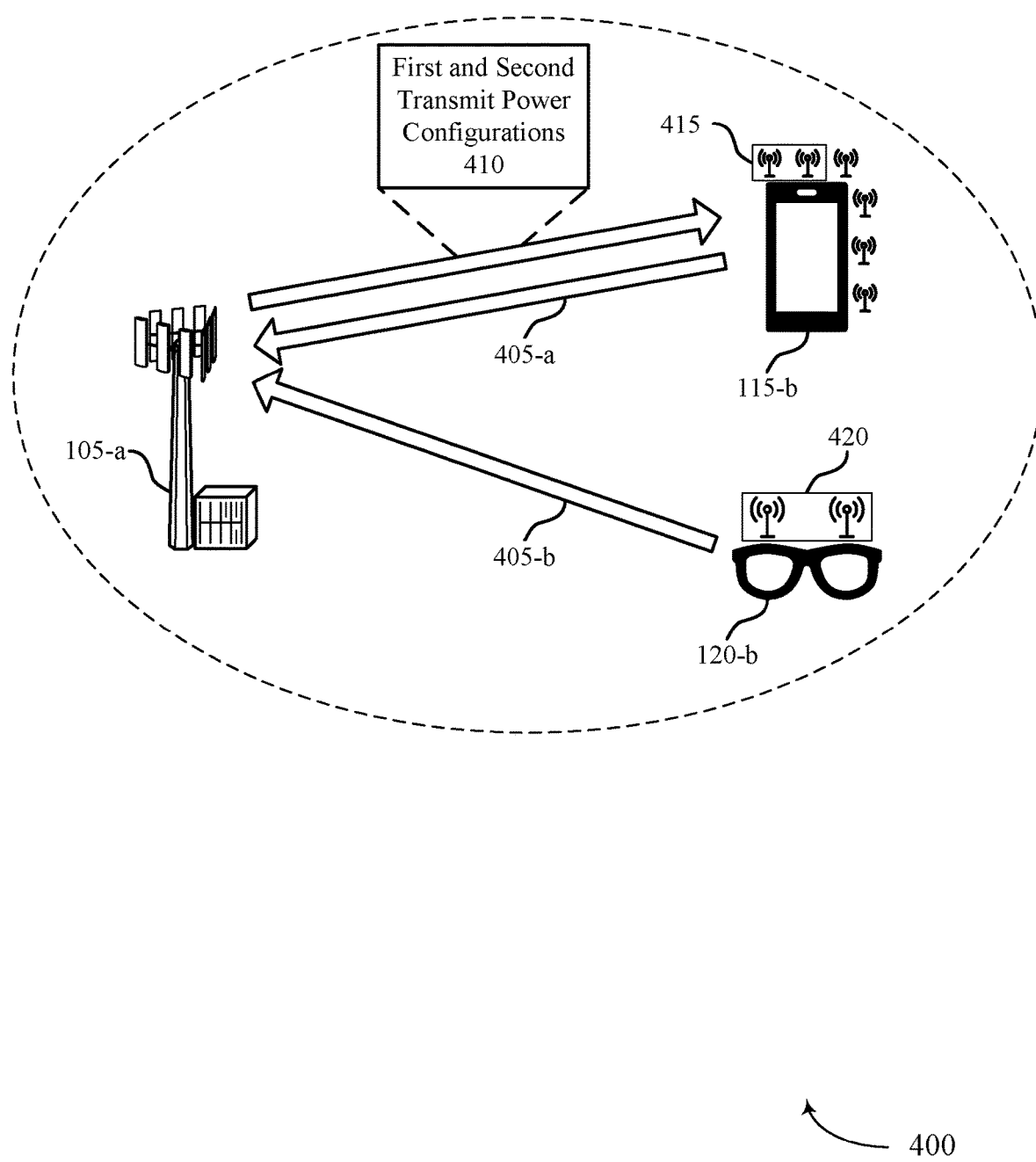
FIG. 4 illustrates an example of a wireless communications system that supports power control for wireless device cooperative transmission schemes in accordance with aspects of the present disclosure.

FIG. 4 illustrates an example of a wireless communications system 400 that supports power control for wireless device cooperative transmission schemes in accordance with aspects of the present disclosure. Wireless communications system 400 includes base station 105-a, which may be an example of a base station 105 described with reference to FIGS. 1-3. Wireless communications system also includes UE 115-b and wireless device 120-b, which may be examples of a UE 115 and a wireless device 120, respectively, described with reference to FIGS. 1-3. UE 115-b may be an example of a first device described with reference to FIG. 3, and wireless device 120-b may be an example of a second device described with reference to FIG. 3. Base station 105-a may communicate with UE 115-b via a communication link 405-a, where communication link 405-a may include one or more configured carriers and a control plane link. In some cases (e.g., where wireless device 120-b also includes a modem capable of communications with base station 105-a), base station 105-a may communicate with wireless device 120-b via a communication link 405-b.

Wireless communications system 400 may implement aspects of wireless communications system 100. For example, UE 115-b and wireless device 120-b in wireless communications system 400 may support efficient techniques for transmitting uplink signals to base station 105-a using shared antennas associated with different power classes. In particular, UE 115-b and base station 105-a may support different power classes, maximum power reduction, or maximum allowed power for transmitting uplink signals on local antennas 415 at the UE 115-b and auxiliary antennas 420 at the wireless device 120-b. That is, a single UE 115-b may support multiple power classes and may receive multiple transmit power configurations to use to determine different transmit powers for transmitting uplink signals to base station 105-a (e.g., on local antennas 415 and auxiliary antennas 420). The different transmit powers may be based on the different capabilities of the first device and the second device. In some cases, UE 115-b may transmit a capability indication to base station 105-a indicating that UE 115-b is capable of using antennas associated with different power classes for transmitting uplink signals to base station 105-a.

In the example of FIG. 4, UE 115-b may receive a control message (e.g., downlink control information (DCI) message, MAC control element (CE) message, RRC message) indicating configurations 410 of first and second transmit powers for transmitting uplink signals using local antennas 415 and auxiliary antennas 420. In some cases, the control message may be received in response to transmitting the capability indication to base station 105-a indicating that UE 115-b is capable of using auxiliary antennas 420 associated with a second power class, in addition to local antennas 415 associated with a first power class. UE 115-b may then generate and transmit first uplink signals via communication link 405-a using local antennas 415 with the first transmit power, and UE 115-b may generate and send a representation (e.g., IQ samples) of second uplink signals to wireless device 120-b for transmission to base station 105-a (e.g., via one or more carriers of communication link 405-a) using auxiliary antennas 420 with the second transmit power.

In some cases, each configuration of a transmit power may apply to specific antenna ports (e.g., across all carriers or across subsets of carriers). For example, a first transmit power configuration (e.g., power class, maximum power reduction, maximum allowed power) may apply to antenna ports associated with local antennas 415 at UE 115-b, and a second transmit power configuration (e.g., power class, maximum power reduction, maximum allowed power) may apply to antenna ports associated with auxiliary antennas 420 at wireless device 120-b. In such cases, UE 115-b may receive configuration information (e.g., in a system information block (SIB), RRC messages, MAC CE messages) indicating the power configuration parameters (e.g., maximum power reduction, maximum allowed power) per set of antenna ports (e.g., where the sum of the power across antenna ports in each set of antenna ports for which a power class is applicable may be limited by an indicated power limit). In some examples, uplink transmissions from different sets of antenna ports may correspond to multi-panel transmissions (e.g., where different beams and polarizations are used for transmitting signals on different sets of antenna ports) or single-panel transmission (e.g., where the same beam and polarization is used to transmit signals on different sets of antenna ports).

In some aspects, each transmit power configuration may apply to a specific set of carriers (e.g., different transmit powers or power classes may apply to distinct or non-overlapping sets of carriers). For example, the first transmit power configuration may apply to carriers allocated for uplink transmissions associated with local antennas 415 at UE 115-b (e.g., carriers three and four) such that any uplink transmissions on these carriers may be performed according to the first transmit power configuration, and the second transmit power configuration may apply to carriers allocated for uplink transmissions associated with auxiliary antennas 420 at wireless device 120-b (e.g., carriers one and two) such that any uplink transmissions on these carriers may be performed according to the second transmit power configuration. In such cases, UE 115-b may receive transmit power configuration information (e.g., via SIB, RRC messages, MAC CE messages) indicating the power configuration parameters (e.g., maximum power reduction, maximum allowed power) per set of carriers (e.g., where the sum of the power across carriers in each set of carriers for which a power class is applicable may be limited by the indicated power limit).

In some aspects, transmit power may be controlled separately for transmissions from the UE 115-b and the wireless device 120-b. For instance, the transmit power may be controlled separately for each set of antennas or each set of carriers (e.g., separate transmit power control loops may be configured, with separate transmit power control commands issued by the base station 105-a). In such aspects, base station 105-a may transmit a first transmit power control (TPC) command for transmissions from the UE 115-b based on a first power control loop configured for transmissions from the UE 115-b, and the base station 105-a may transmit a second TPC command for transmissions from the wireless device 120-b based on a second power control loop configured for transmissions from the wireless device 120-b. The first TPC command may be a delta (or offset) of a first, current transmit power being used by UE 115-b for transmissions to base station 105-a, and the second TPC command may be a delta (or offset) of a second, current transmit power being used by wireless device 120-b for transmissions to base station 105-a. That is, since the UE 115-b and the wireless device 120-b may have separate power control loops, the base station 105-a may issue separate power control commands (e.g., one for transmissions from antennas of the UE 115-b and one for transmissions from antennas of the wireless device 120-b).

Figure 5:
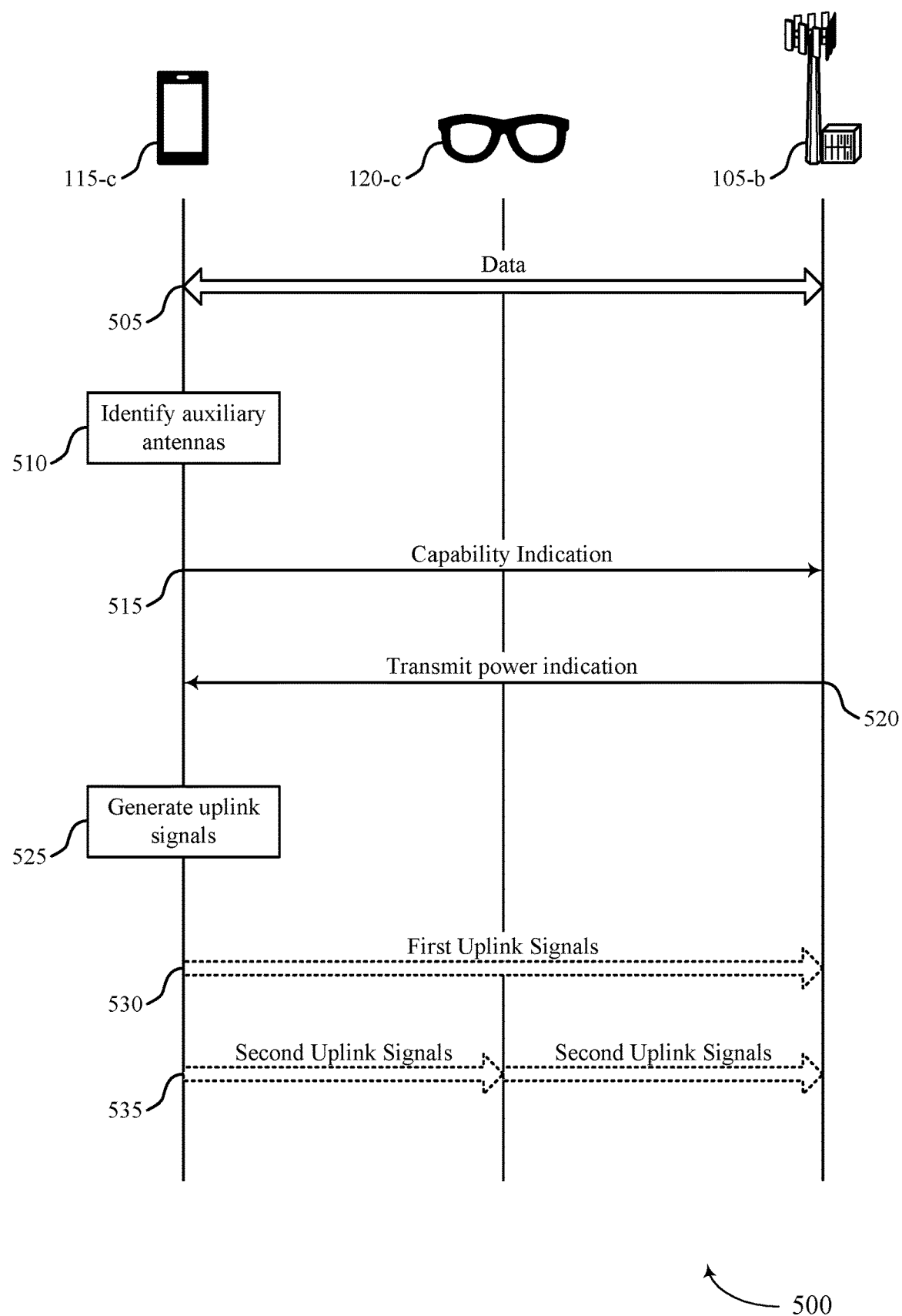
FIG. 5 illustrates an example of a process flow that supports power control for wireless device cooperative transmission schemes in accordance with aspects of the present disclosure.

FIG. 5 illustrates an example of a process flow 500 that supports power control for wireless device cooperative transmission schemes in accordance with aspects of the present disclosure. Process flow 500 illustrates aspects of techniques performed by a UE 115-c, which may be an example of a UE 115 described with reference to FIGS. 1-4. Process flow 500 also illustrates aspects of techniques performed by wireless device 120-c, which may be an example of a wireless device 120 described with reference to FIGS. 1-4. Process flow 500 also illustrates aspects of techniques performed by a base station 105-b, which may be an example of a base station 105 described with reference to FIGS. 1-4. As described herein, UE 115-c may be referred to as a first device, and wireless device 120-c may be referred to as a second device.

At 505, UE 115-c may communicate (e.g., exchange data) with base station 105-b over a first communication link using a set of local antennas associated with a first power class. In some examples, the communication at 505 may be an example of a connection procedure (e.g., RRC connection procedure) between UE 115-c and base station 105-b. In some examples, the operations of communication at 505 may occur at a communications manager. At 510, UE 115-c may identify a set of auxiliary antennas of wireless device 120-c associated with a second power class for transmitting uplink signals to base station 105-b. UE 115-c may receive configuration information from wireless device 120-c via a modem of the wireless device (not shown), and UE 115-c may determine from the configuration information that wireless device 120-c may provide additional antennas to UE 115-c for uplink transmissions to base station 105-b. In some examples, identification of a set of auxiliary antennas of wireless device 120-c may be performed by an auxiliary antenna manager. UE 115-c may be in communication with wireless device 120-c over a second communication link. The second communication link may be a USB link, a Bluetooth link, a Wi-Fi link, or a 5G sidelink. At 515, UE 115-c may transmit a capability indication to base station 105-b indicating the second power class for the set of auxiliary antennas. In some cases, the UE 115-c may indicate power classes associated with the set of local antennas and the set of auxiliary antennas. For example, the UE 115-c may indicate a first power class for the set of local antennas and a second power class for and the set of auxiliary antennas. In some examples, transmitting the capability indication may be performed by a power class manager.

At 520, UE 115-c may receive a control message (e.g., DCI message, RRC message, MAC CE message) from base station 105-b indicating a first transmit power configuration (e.g., maximum power reduction indicator, maximum allowed power) for transmitting uplink signals via the set of local antennas and a second transmit power configuration for transmitting uplink signals via the set of auxiliary antennas. In some cases, the control message may be received in response to transmitting the capability indication to base station 105-b indicating that UE 115-c is capable of using auxiliary antennas associated with a second power class, in addition to local antennas associated with a first power class. In some examples, base station 105-b may transmit the control message with a transmit power manager.

The first and second transmit power configurations may apply the per device power classes across all carriers, or across subsets (e.g., non-intersecting subsets) of subcarriers. For example, a first power class limit (e.g., XR power-class limit) may apply to a first subset of carriers and a second power class limit (e.g., UE power-class limit) may apply to a second subset of carriers. Additionally, or alternatively, the control message may associate the set of local antennas and the set of auxiliary antennas to different sets of antenna ports. For example, the set of local antennas may be associated with a first set of antenna ports and the set of auxiliary antennas may be associated with a second set of antenna ports. Additionally, or alternatively, different maximum power reduction may be applied for the different sets of antennas. For example, a first maximum power reduction (or table of maximum power reduction values according to transmission bandwidth) may be applied for transmissions via the set of local antennas and a second maximum power reduction (or table of maximum power reduction values according to transmission bandwidth) may be applied for transmissions via the set of auxiliary antennas. Additionally or alternatively, different maximum allowed power values may be provided per set of antennas (e.g., per cell). For example, for a given serving cell, a first maximum allowed power value may be configured for the set of local antennas and a second, different maximum allowed power value may be configured for the set of auxiliary antennas. The control message may also include transmit power control commands associated with the different transmit power configurations. For example, the control message may include a first transmit power control command that applies to the first subset of carriers or first set of antenna ports and a second transmit power control command that applies to the second subset of carriers or second set of antenna ports.

At 525, UE 115-c may generate first uplink signals for transmission to base station 105-b on local antennas at UE 115-c, and/or UE 115-c may generate a representation (e.g., IQ samples) of second uplink signals for transmission to base station 105-b via auxiliary antennas at wireless device 120-c. In some examples, UE 115-c may generate the uplink signals with an uplink signal manager. At 530, UE 115-c may transmit the first uplink signals using at least one antenna from the set of local antennas according to the first power configuration received from base station 105-b at 520. For example, the UE 115-c may transmit the first uplink signals using at least one antenna from the set of local antennas at a first transmit power determined in accordance with a first maximum power reduction, a first maximum allowed power, a first transmit power control command, or combinations thereof. In some examples, UE 115-c may transmit the first uplink signals with an uplink signal manager. Additionally, or alternatively, at 535, UE 115-c may send the representation (e.g., IQ samples) of the second uplink signals to the second device 120-c for transmission via at least one antenna from the set of auxiliary antennas according to the second transmit power configuration received from base station 105-b at 520. For example, the second device 120-c may transmit the second uplink signals using at least one antenna from the set of auxiliary antennas at a second transmit power determined in accordance with a second maximum power reduction, a second maximum allowed power, a second transmit power control command, or combinations thereof. UE 115-c may also transmit a control message to wireless device 120-c indicating the second power for transmitting the second uplink signals via the set of auxiliary antennas. Wireless device 120-c may receive the samples of the second uplink signals and the indication of the second power, and wireless device 120-c may upconvert, amplify, and transmit the second uplink signals with the second power to base station 105-b using the auxiliary antennas. In some examples, wireless device 120-c may transmit the second uplink signals with an uplink signal manager.

Figure 6:
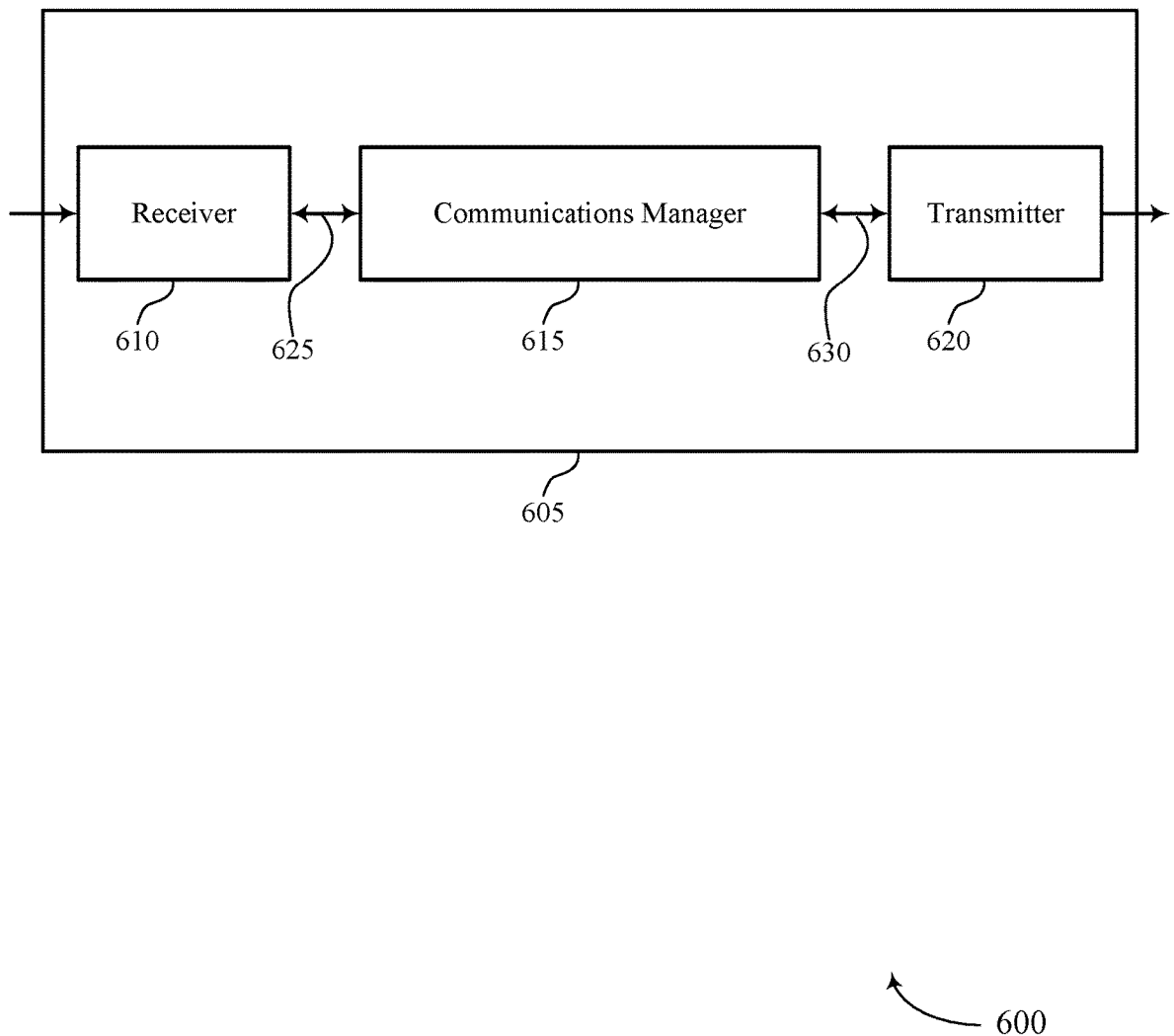
FIGS. 6 and 7 show block diagrams of devices that support power control for wireless device cooperative transmission schemes in accordance with aspects of the present disclosure.

FIG. 6 shows a block diagram 600 of a device 605 that supports power control for wireless device cooperative transmission schemes in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to power control for wireless device cooperative transmission schemes, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may communicate with a base station over a first communication link using a set of local antennas associated with a first power class, identify a set of auxiliary antennas of a second device associated with a second power class for transmitting uplink signals to the base station, where the first device is in communication with the second device over a second communication link, transmit, based on identifying the set of auxiliary antennas of the second device, an indication of the second power class for the set of auxiliary antennas to the base station, identify uplink signals to transmit to the base station using at least one antenna of the set of local antennas of the first device associated with the first power class or of the set of auxiliary antennas of the second device associated with the second power class, and transmit the uplink signals to the base station via the at least one antenna. The communications manager 615 may be an example of aspects of the communications manager 910 described herein. The communications manager 615 may exchange information 625 with receiver 610. For example, the communications manager 615 may receive a control message (e.g., DCI message, RRC message, MAC CE message) from receiver 610 indicating a first transmit power configuration (e.g., maximum power reduction indicator, maximum allowed power) for transmitting uplink signals via a set of local antennas and a second transmit power configuration for transmitting uplink signals via a set of auxiliary antennas. The communications manager 615 may exchange information 630 with transmitter 620. For example, the communications manager 615 may communicate first uplink signals according to the first power configuration and/or second uplink signals according to the second transmit power configuration for transmission by transmitter 620.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The actions performed by the communications manager 615 as described herein may be implemented to realize one or more potential advantages. One implementation may allow a UE 115 to provide improved quality and reliability of service, as throughput is increased and distorted uplink signals are mitigated.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
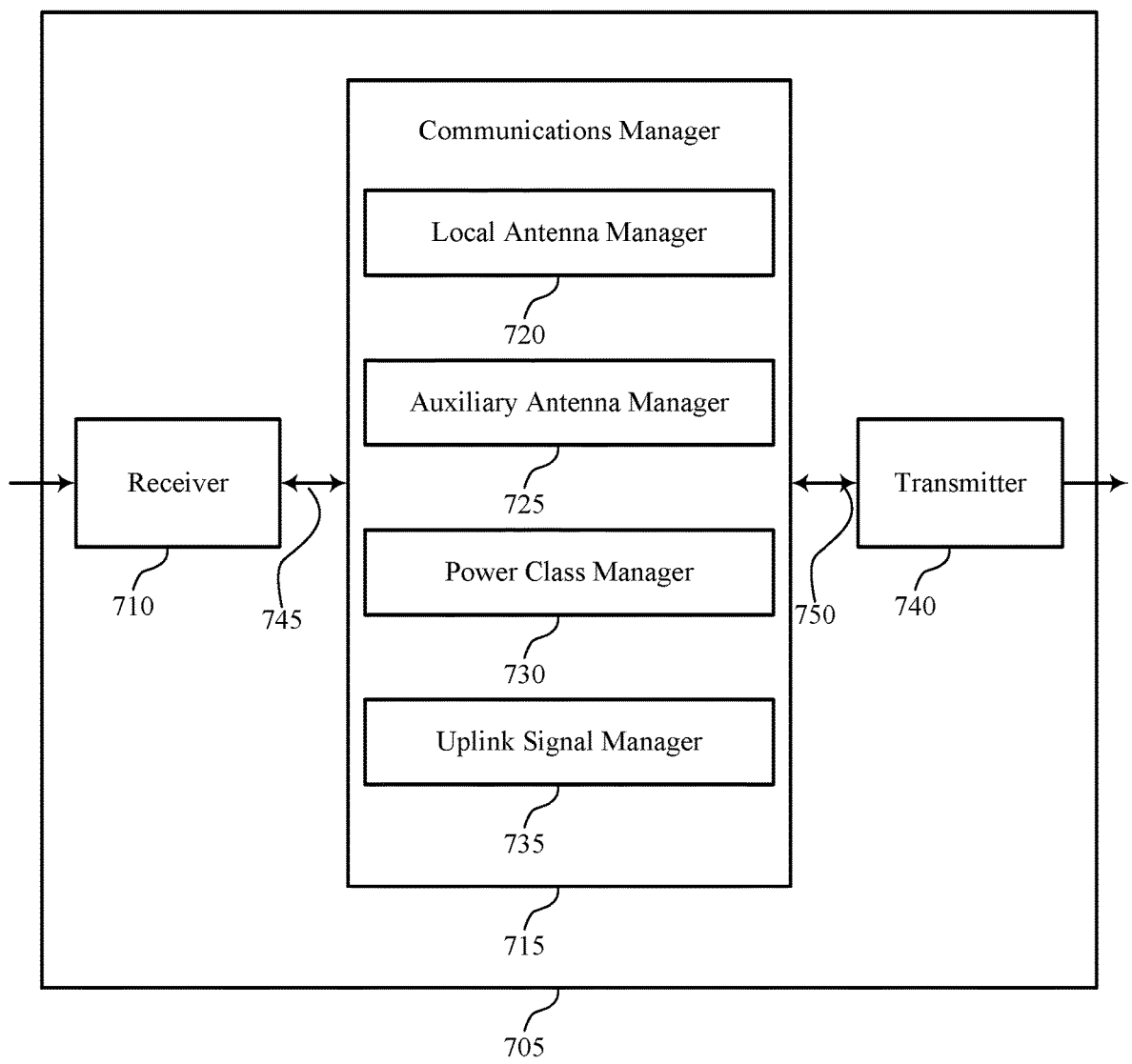

FIG. 7 shows a block diagram 700 of a device 705 that supports power control for wireless device cooperative transmission schemes in accordance with aspects of the present disclosure. The device 705 may be an example of aspects of a device 605, or a UE 115 as described herein. The device 705 may include a receiver 710, a communications manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to power control for wireless device cooperative transmission schemes, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a local antenna manager 720, an auxiliary antenna manager 725, a power class manager 730, and an uplink signal manager 735. The communications manager 715 may be an example of aspects of the communications manager 910 described herein. The communications manager 715 may exchange information 745 with receiver 710. For example, the communications manager 715 may receive a control message (e.g., DCI message, RRC message, MAC CE message) from receiver 710 indicating a first transmit power configuration (e.g., maximum power reduction indicator, maximum allowed power) for transmitting uplink signals via a set of local antennas and a second transmit power configuration for transmitting uplink signals via a set of auxiliary antennas. The communications manager 715 may exchange information 750 with transmitter 740. For example, the communications manager 715 may communicate first uplink signals according to the first power configuration and/or second uplink signals according to the second transmit power configuration for transmission by transmitter 740.

The local antenna manager 720 may communicate with a base station over a first communication link using a set of local antennas associated with a first power class. The auxiliary antenna manager 725 may identify a set of auxiliary antennas of a second device associated with a second power class for transmitting uplink signals to the base station, where the first device is in communication with the second device over a second communication link. The power class manager 730 may transmit, based on identifying the set of auxiliary antennas of the second device, an indication of the second power class for the set of auxiliary antennas to the base station. The uplink signal manager 735 may identify uplink signals to transmit to the base station using at least one antenna of the set of local antennas of the first device associated with the first power class or of the set of auxiliary antennas of the second device associated with the second power class and transmit the uplink signals to the base station via the at least one antenna.

The transmitter 740 may transmit signals generated by other components of the device 705. In some examples, the transmitter 740 may be collocated with a receiver 710 in a transceiver module. For example, the transmitter 740 may be an example of aspects of the transceiver 920 described with reference to FIG. 9. The transmitter 740 may utilize a single antenna or a set of antennas.

Figure 8:
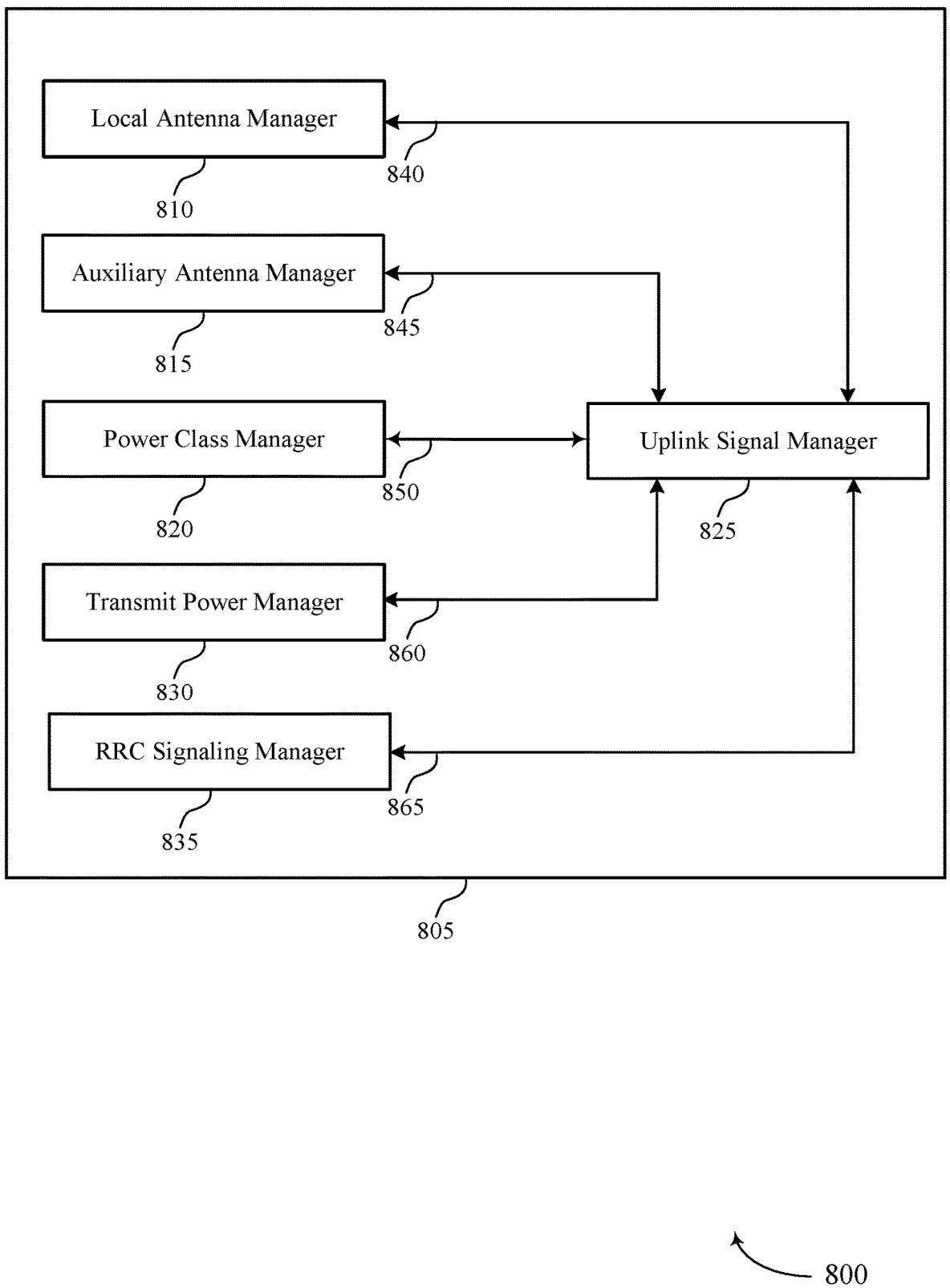
FIG. 8 shows a block diagram of a communications manager that supports power control for wireless device cooperative transmission schemes in accordance with aspects of the present disclosure.

FIG. 8 shows a block diagram 800 of a communications manager 805 that supports power control for wireless device cooperative transmission schemes in accordance with aspects of the present disclosure. The communications manager 805 may be an example of aspects of a communications manager 615, a communications manager 715, or a communications manager 910 described herein. The communications manager 805 may include a local antenna manager 810, an auxiliary antenna manager 815, a power class manager 820, an uplink signal manager 825, a transmit power manager 830, and a RRC signaling manager 835. Each of these modules may communicate, directly or indirectly, with one another (e.g., via one or more buses).

The local antenna manager 810 may communicate with a base station over a first communication link using a set of local antennas associated with a first power class. In some examples, the local antenna manager 810 may communicate information 840 to the uplink signal manager 825 which may include first uplink signals using at least one antenna from the set of local antennas at a first transmit power determined in accordance with a first maximum power reduction, a first maximum allowed power, a first transmit power control command, or combinations thereof. The auxiliary antenna manager 815 may identify a set of auxiliary antennas of a second device associated with a second power class for transmitting uplink signals to the base station, where the first device is in communication with the second device over a second communication link. In some examples, the auxiliary antenna manager 815 may communicate information 845 to the uplink signal manager 825 which may include second uplink signals using at least one antenna from the set of auxiliary antennas at a second transmit power determined in accordance with a second maximum power reduction, a second maximum allowed power, a second transmit power control command, or combinations thereof.

The power class manager 820 may transmit, based on identifying the set of auxiliary antennas of the second device, an indication of the second power class for the set of auxiliary antennas to the base station. In some examples, the power class manager 820 may communicate information 850 to the uplink signal manager 825 which may include an indication of the second power class for the set of auxiliary antennas. The uplink signal manager 825 may identify uplink signals to transmit to the base station using at least one antenna of the set of local antennas of the first device associated with the first power class or of the set of auxiliary antennas of the second device associated with the second power class. In some examples, the uplink signal manager 825 may transmit the uplink signals to the base station via the at least one antenna. In some examples, the uplink signal manager 825 may communicate information which may include uplink signals associated with the first power class or the second power class.

The transmit power manager 830 may receive, from the base station, a first power control command associated with transmitting the uplink signals via the set of local antennas of the first device and a second power control command associated with transmitting the uplink signals via the set of auxiliary antennas of the second device. In some examples, the transmit power manager 830 may communicate information 860 to the uplink signal manager 825 which may include a first power control command or a second power control command. In some examples, the uplink signal manager 825 may transmit a first component signal of the uplink signals to the base station via the at least one antenna of the set of local antennas of the first device based on a first power control loop associated with the set of local antennas of the first device and the first power control command. In some examples, the uplink signal manager 825 may transmit a second component signal of the uplink signals to the base station via the at least one antenna of the set of auxiliary antennas of the second device based on a second power control loop associated with the set of auxiliary antennas of the second device and the second power control command. In some examples, the transmit power manager 830 may transmit, to the second device over the second communication link, a control message indicating a transmit power for transmitting the uplink signals via the set of auxiliary antennas of the second device.

In some examples, the uplink signal manager 825 may send in-phase and quadrature samples of the uplink signals to the second device for transmission to the base station via the at least one antenna of the set of auxiliary antennas of the second device. In some cases, the in-phase and quadrature samples are compressed. In some cases, the first power class is applied to antenna ports of the first device associated with the set of local antennas. In some cases, the second power class is applied to antenna ports of the second device associated with the set of auxiliary antennas. In some cases, the first power class is applied to a first set of carriers allocated for uplink transmissions from the first device using the set of local antennas. In some cases, the second power class is applied to a second set of carriers allocated for uplink transmissions from the second device using the set of auxiliary antennas.

The RRC signaling manager 835 may receive RRC signaling indicating a first maximum power reduction and a first maximum allowed power ($P_{EMAX}$) associated with the first power class and a second maximum power reduction and a second maximum allowed power ($P_{EMAX}$) associated with the second power class. In some examples, the RRC signaling manager 835 may communicate information 865 to the uplink signal manager 825 which may include a first maximum power reduction and a first maximum allowed power and a second maximum power reduction and a second maximum allowed power. In some cases, the first device is capable of supporting a set of power classes including the first power class and the second power class. In some cases, the second communication link includes a USB link, a Bluetooth link, a Wi-Fi link, or a sidelink. In some cases, the first device is a UE, a head mounted display, or a wearable device, and the second device is a UE, a head mounted display, or a wearable device, where the head mounted display includes an extended reality head mounted display, an augmented reality head mounted display, or a virtual reality head mounted display.

Figure 9:
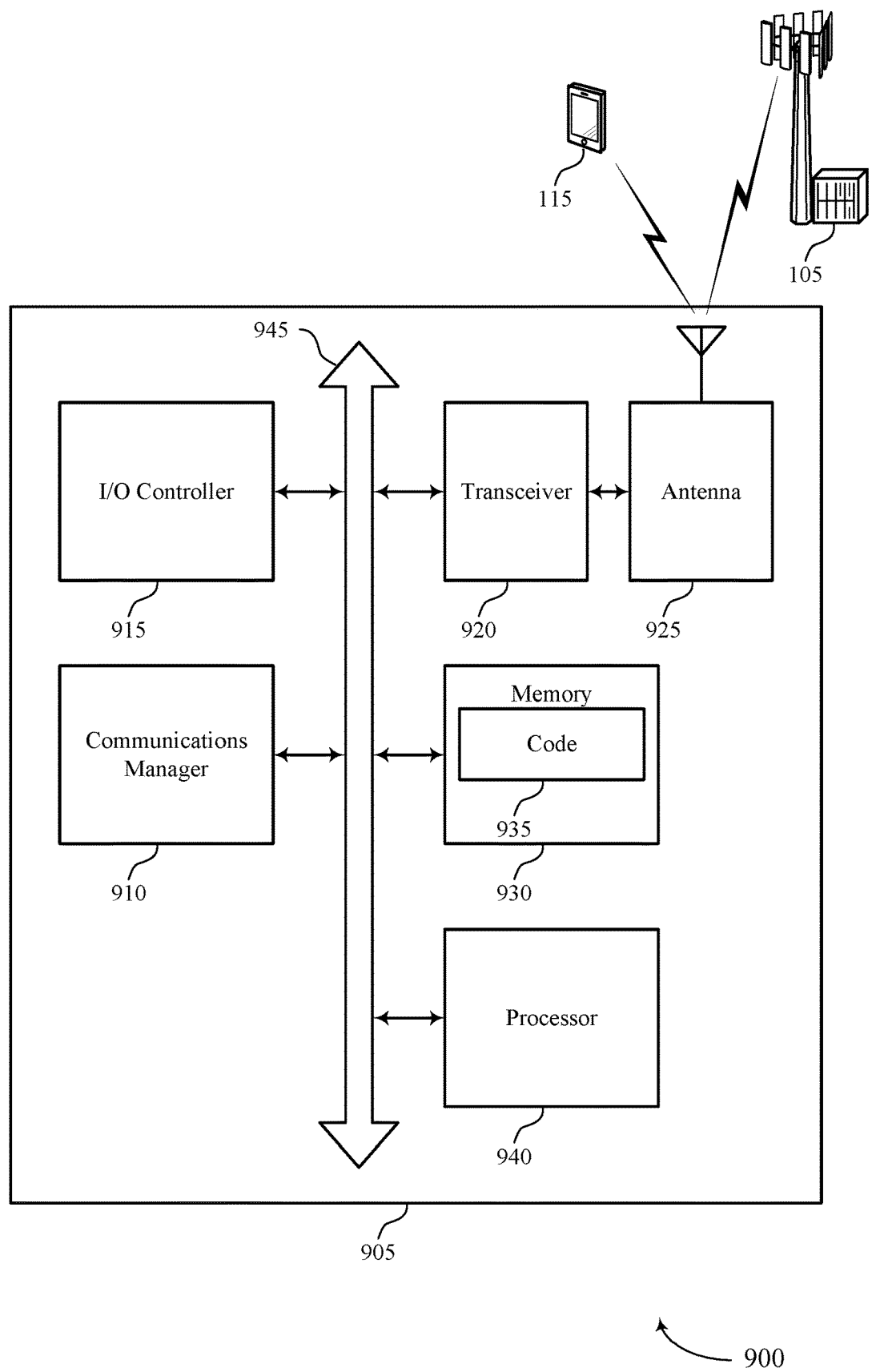
FIG. 9 shows a diagram of a system including a device that supports power control for wireless device cooperative transmission schemes in accordance with aspects of the present disclosure.

FIG. 9 shows a diagram of a system 900 including a device 905 that supports power control for wireless device cooperative transmission schemes in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may communicate with a base station over a first communication link using a set of local antennas associated with a first power class, identify a set of auxiliary antennas of a second device associated with a second power class for transmitting uplink signals to the base station, where the first device is in communication with the second device over a second communication link, transmit, based on identifying the set of auxiliary antennas of the second device, an indication of the second power class for the set of auxiliary antennas to the base station, identify uplink signals to transmit to the base station using at least one antenna of the set of local antennas of the first device associated with the first power class or of the set of auxiliary antennas of the second device associated with the second power class, and transmit the uplink signals to the base station via the at least one antenna.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting power control for wireless device cooperative transmission schemes).

Based on transmitting uplink signals to a base station using shared antennas associated with different power classes, a processor 940 may efficiently determine a configuration resulting in increased throughput and undistorted uplink signals. As such, the processor may be ready to respond more efficiently through the reduction of a ramp up in processing power due to distorted signals.

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
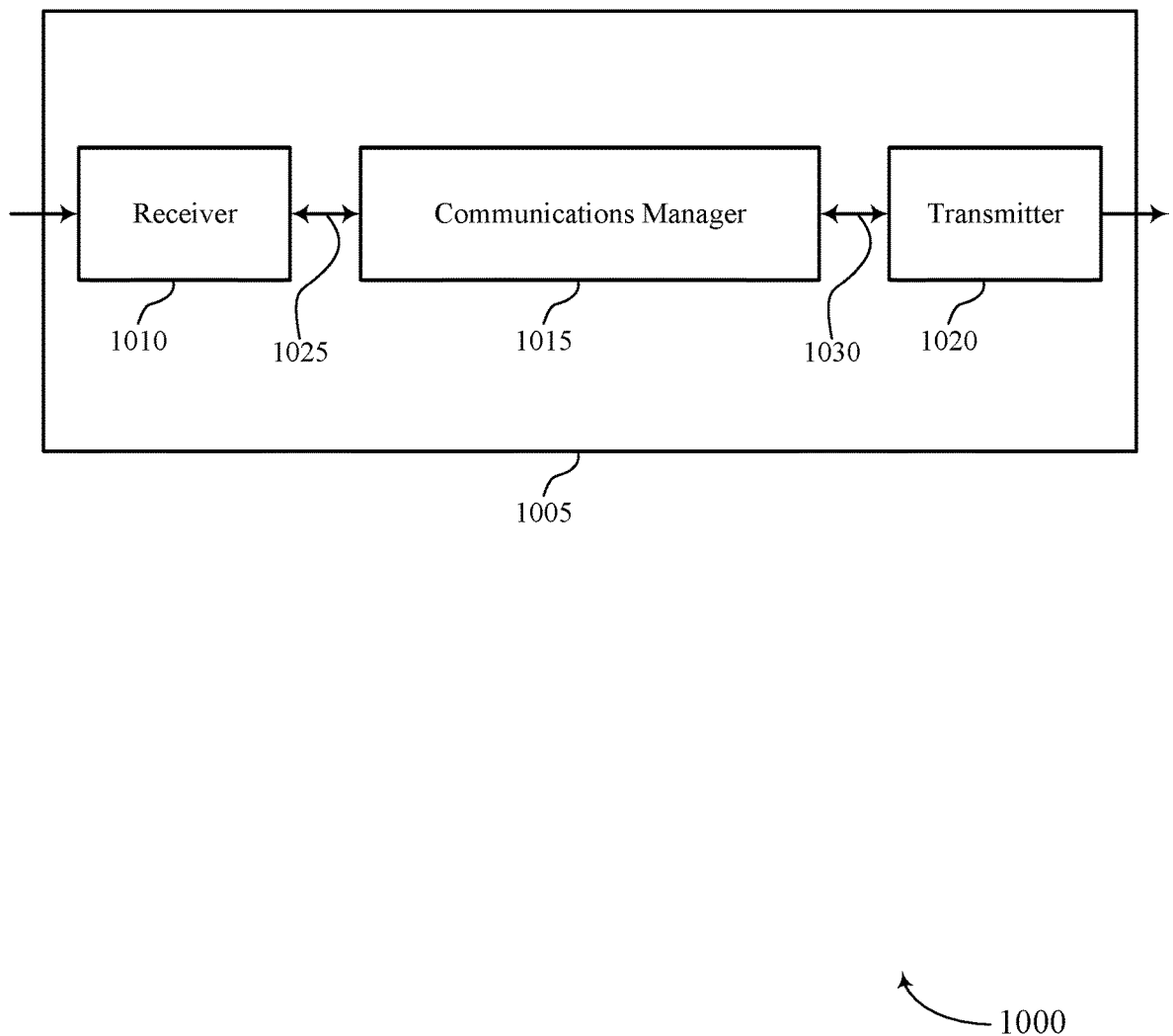
FIGS. 10 and 11 show block diagrams of devices that support power control for wireless device cooperative transmission schemes in accordance with aspects of the present disclosure.

FIG. 10 shows a block diagram 1000 of a device 1005 that supports power control for wireless device cooperative transmission schemes in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to power control for wireless device cooperative transmission schemes, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may communicate with a first device over a first communication link, the first device using a set of local antennas associated with a first power class, receive, from the first device, an indication of a second power class associated with a set of auxiliary antennas of a second device, where the first device is in communication with the second device over a second communication link, transmit, to the first device, a control message indicating a first power for uplink transmissions via the set of local antennas of the first device and a second power for uplink transmissions via the set of auxiliary antennas of the second device, and receive first uplink signals from the first device transmitted with the first power and second uplink signals from the second device transmitted with the second power based on the transmitting. The communications manager 1015 may be an example of aspects of the communications manager 1310 described herein. The communications manager 1015 may exchange information 1025 with receiver 1010. For example, the communications manager 1015 may receive from receiver 1010 first uplink signals according to the first power configuration and/or second uplink signals according to the second transmit power configuration. The communications manager 1015 may exchange information 1030 with transmitter 1020. For example, the communications manager 1015 may communicate a control message (e.g., DCI message, RRC message, MAC CE message) to transmitter 1020 indicating a first transmit power configuration (e.g., maximum power reduction indicator, maximum allowed power) for transmitting uplink signals via a set of local antennas and a second transmit power configuration for transmitting uplink signals via a set of auxiliary antennas.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The actions performed by the communications manager 1015 as described herein may be implemented to realize one or more potential advantages. One implementation may allow a base station 105 to provide improved quality and reliability of service, as throughput is increased and distorted uplink signals are mitigated.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
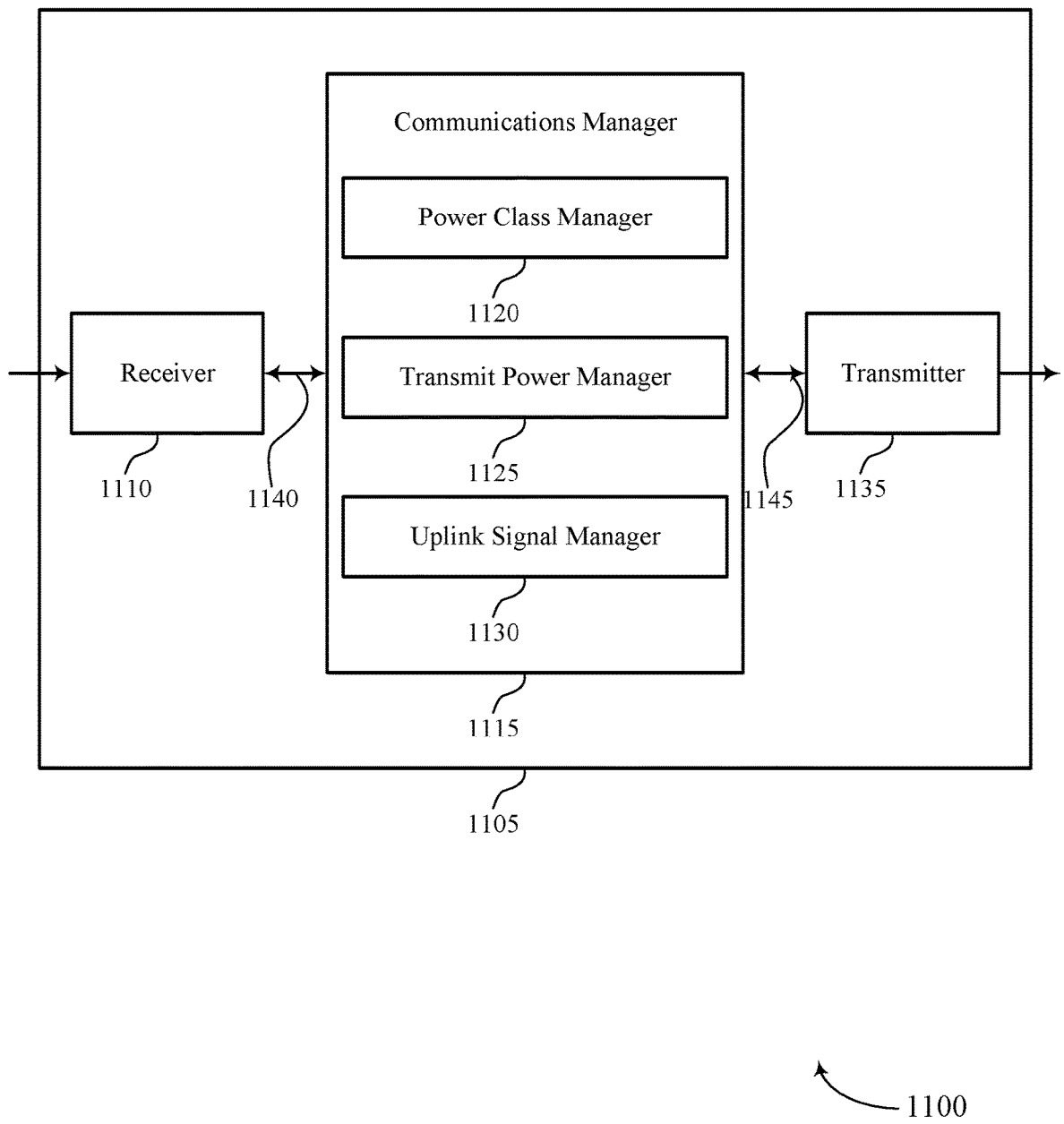

FIG. 11 shows a block diagram 1100 of a device 1105 that supports power control for wireless device cooperative transmission schemes in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to power control for wireless device cooperative transmission schemes, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a power class manager 1120, a transmit power manager 1125, and an uplink signal manager 1130. The communications manager 1115 may be an example of aspects of the communications manager 1310 described herein. The communications manager 1115 may exchange information 1140 with receiver 1110. For example, the communications manager 1115 may receive from receiver 1110 first uplink signals according to the first power configuration and/or second uplink signals according to the second transmit power configuration. The communications manager 1115 may exchange information 1145 with transmitter 1135. For example, the communications manager 1115 may communicate a control message (e.g., DCI message, RRC message, MAC CE message) to transmitter 1135 indicating a first transmit power configuration (e.g., maximum power reduction indicator, maximum allowed power) for transmitting uplink signals via a set of local antennas and a second transmit power configuration for transmitting uplink signals via a set of auxiliary antennas.

The power class manager 1120 may communicate with a first device over a first communication link, the first device using a set of local antennas associated with a first power class and receive, from the first device, an indication of a second power class associated with a set of auxiliary antennas of a second device, where the first device is in communication with the second device over a second communication link. The transmit power manager 1125 may transmit, to the first device, a control message indicating a first power for uplink transmissions via the set of local antennas of the first device and a second power for uplink transmissions via the set of auxiliary antennas of the second device. The uplink signal manager 1130 may receive first uplink signals from the first device transmitted with the first power and second uplink signals from the second device transmitted with the second power based on the transmitting.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
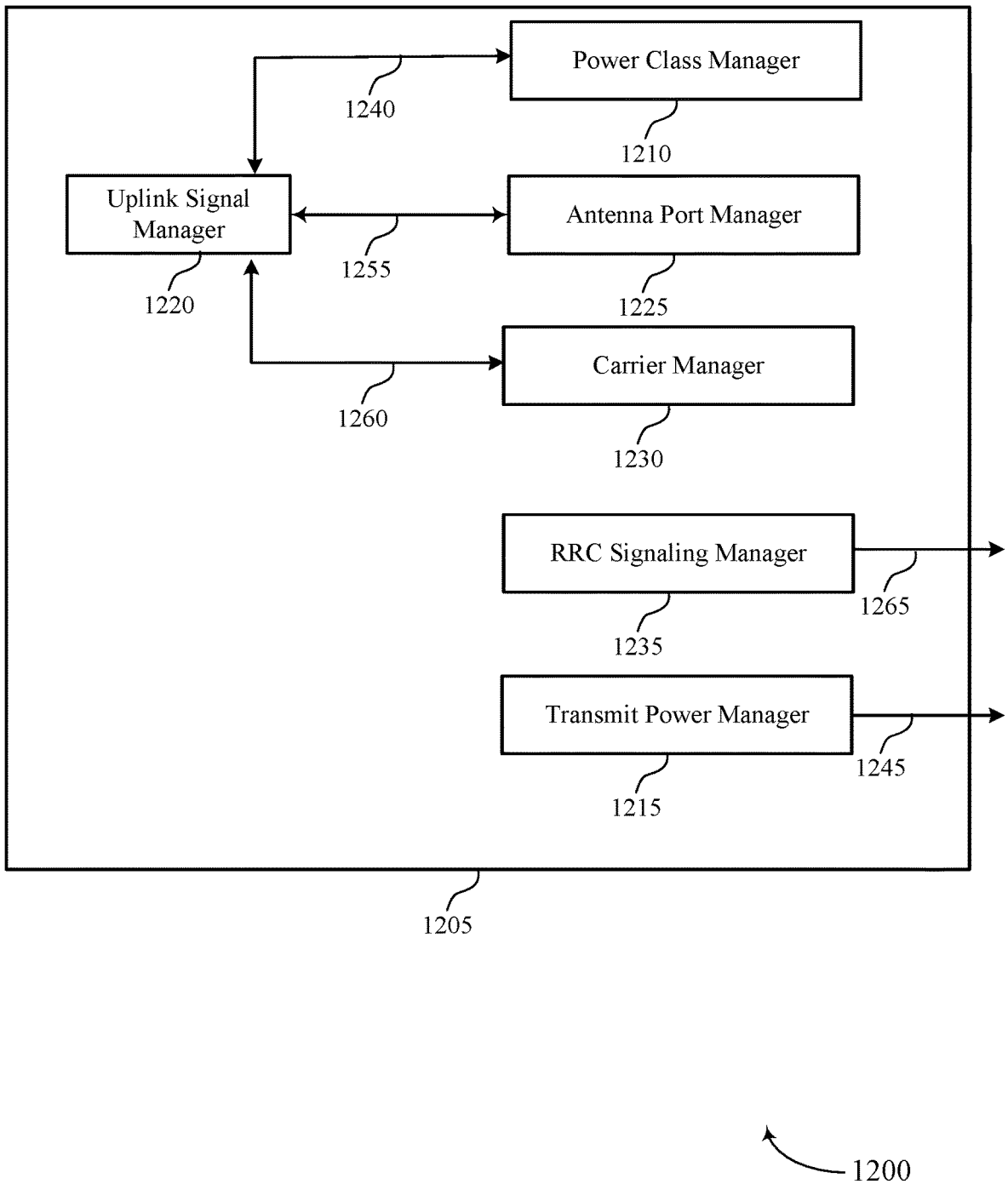
FIG. 12 shows a block diagram of a communications manager that supports power control for wireless device cooperative transmission schemes in accordance with aspects of the present disclosure.

FIG. 12 shows a block diagram 1200 of a communications manager 1205 that supports power control for wireless device cooperative transmission schemes in accordance with aspects of the present disclosure. The communications manager 1205 may be an example of aspects of a communications manager 1015, a communications manager 1115, or a communications manager 1310 described herein. The communications manager 1205 may include a power class manager 1210, a transmit power manager 1215, an uplink signal manager 1220, an antenna port manager 1225, a carrier manager 1230, and a RRC signaling manager 1235. Each of these modules may communicate, directly or indirectly, with one another (e.g., via one or more buses).

The power class manager 1210 may communicate with a first device over a first communication link, the first device using a set of local antennas associated with a first power class. In some examples, the power class manager 1210 may receive, from the first device, an indication of a second power class associated with a set of auxiliary antennas of a second device, where the first device is in communication with the second device over a second communication link. In some examples, the power class manager 1210 may communicate information 1240 from the uplink signal manager 1240 which may include an indication of a second power class associated with a set of auxiliary antennas. The transmit power manager 1215 may transmit, to the first device, a control message indicating a first power for uplink transmissions via the set of local antennas of the first device and a second power for uplink transmissions via the set of auxiliary antennas of the second device. In some examples, the transmit power manager 1215 may communicate information 1245 which may include a control message indicating a first power for uplink transmissions via a set of local antennas and a second power for uplink transmissions via a set of auxiliary antennas. The uplink signal manager 1220 may receive first uplink signals from the first device transmitted with the first power and second uplink signals from the second device transmitted with the second power based on the transmitting. In some examples, the uplink signal manager 1220 may communicate information which may include receiving first uplink signals transmitted with a first power and second uplink signals transmitted with a second power.

In some cases, the first power class is applied to antenna ports of the first device associated with the set of local antennas. In some cases, the second power class is applied to antenna ports of the second device associated with the set of auxiliary antennas. The antenna port manager 1225 may identify a first antenna port index associated with the first uplink signals and a second antenna port index associated with the second uplink signals. In some examples, the antenna port manager 1225 may communicate information 1255 from the uplink signal manager 1240 which may include a first antenna port index associated with first uplink signals and a second antenna port index associated with second uplink signals. In some examples, the uplink signal manager 1220 may determine that the first uplink signals are from the first device based on the first antenna port index and the second uplink signals are from the second device based on the second antenna port index.

In some cases, the first power class is applied to a first set of carriers allocated for uplink transmissions from the first device using the set of local antennas. In some cases, the second power class is applied to a second set of carriers allocated for uplink transmissions from the second device using the set of auxiliary antennas. The carrier manager 1230 may identify that the first uplink signals are received on the first set of carriers and the second uplink signals are received on the second set of carriers. In some examples, the carrier manager 1230 may communicate information 1260 from the uplink signal manager 1240 which may include first uplink signals received on a first set of carriers and second uplink signals received on a second set of carriers. In some examples, the uplink signal manager 1220 may determine that the first uplink signals are from the first device based on the first uplink signals being received on the first set of carriers and the second uplink signals are from the second device based on the second uplink signals being received on the second set of carriers.

The RRC signaling manager 1235 may transmit RRC signaling indicating a first maximum power reduction and a first maximum allowed power ($P_{EMAX}$) associated with the first power class and a second maximum power reduction and a second maximum allowed power ($P_{EMAX}$) associated with the second power class. In some examples, the RRC signaling manager 1235 may communicate information 1265 which may include RRC signaling indicating a first maximum power reduction and a first maximum allowed power, and a second maximum power reduction and a second maximum allowed power. In some cases, the first device is capable of supporting a set of power classes including the first power class and the second power class. In some cases, the second communication link includes a USB link, a Bluetooth link, a Wi-Fi link, or a sidelink. In some cases, the first device is a UE, a head mounted display, or a wearable device, and the second device is a UE, a head mounted display, or a wearable device, where the head mounted display includes an extended reality head mounted display, an augmented reality head mounted display, or a virtual reality head mounted display.

Figure 13:
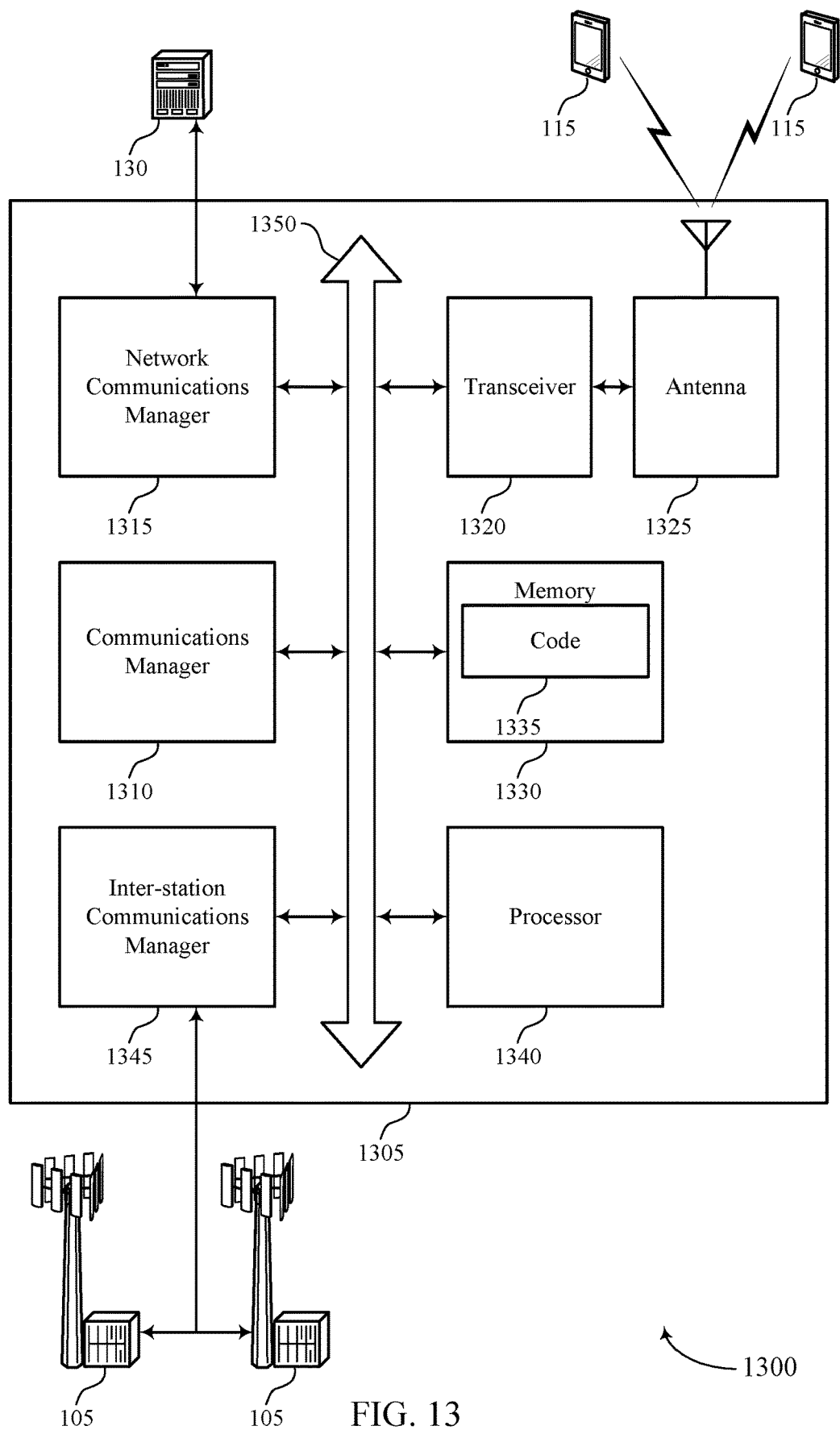
FIG. 13 shows a diagram of a system including a device that supports power control for wireless device cooperative transmission schemes in accordance with aspects of the present disclosure.

FIG. 13 shows a diagram of a system 1300 including a device 1305 that supports power control for wireless device cooperative transmission schemes in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may communicate with a first device over a first communication link, the first device using a set of local antennas associated with a first power class, receive, from the first device, an indication of a second power class associated with a set of auxiliary antennas of a second device, where the first device is in communication with the second device over a second communication link, transmit, to the first device, a control message indicating a first power for uplink transmissions via the set of local antennas of the first device and a second power for uplink transmissions via the set of auxiliary antennas of the second device, and receive first uplink signals from the first device transmitted with the first power and second uplink signals from the second device transmitted with the second power based on the transmitting.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting power control for wireless device cooperative transmission schemes).

Based on transmitting uplink signals using shared antennas associated with different power classes, a processor 1340 may efficiently determine a configuration resulting in increased throughput and undistorted uplink signals. As such, the processor may be ready to respond more efficiently through the reduction of a ramp up in processing power due to distorted signals.

The inter-station communications manager 1345 may manage communications with other base station 105 and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
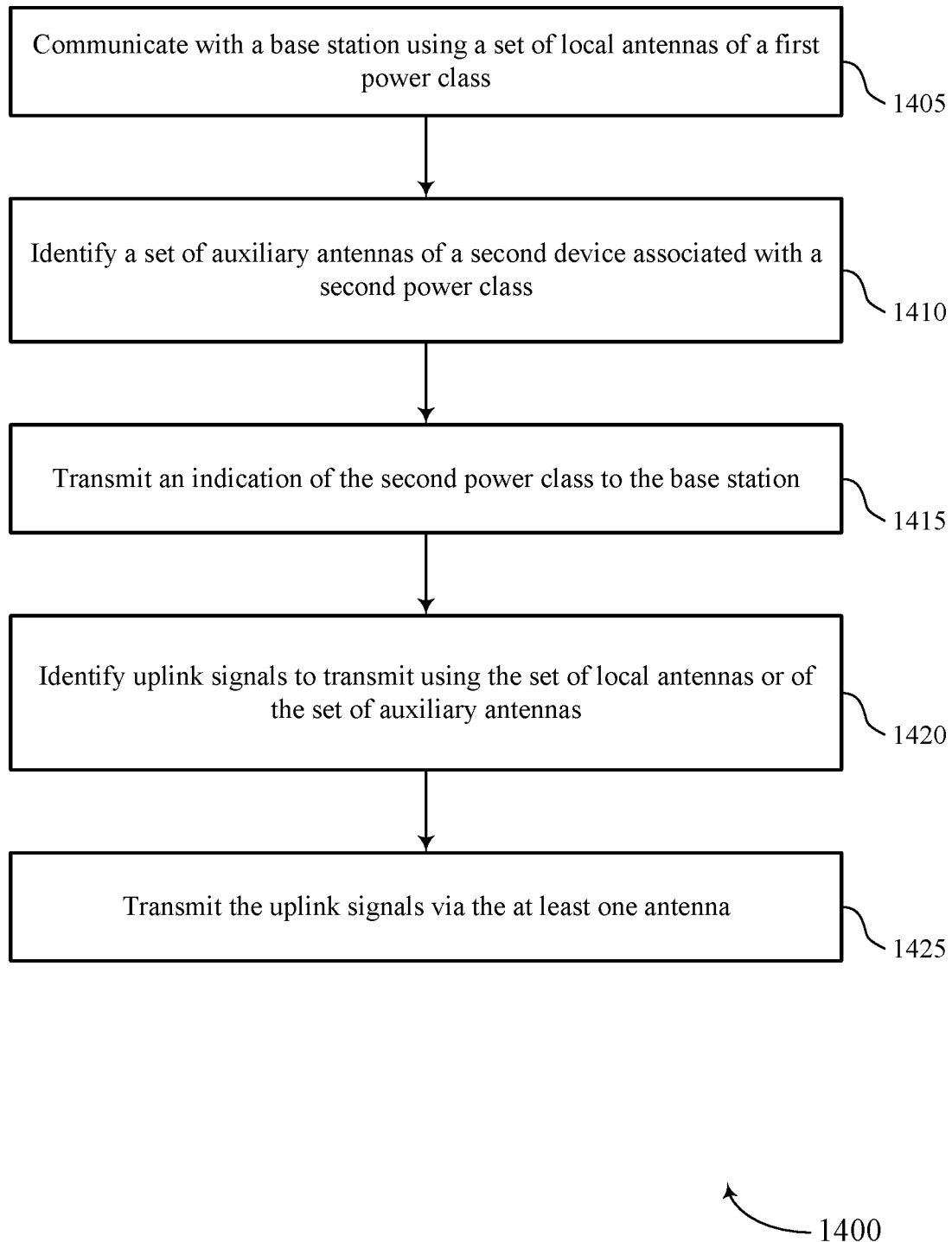
FIGS. 14 and 15 show flowcharts illustrating methods that support power control for wireless device cooperative transmission schemes in accordance with aspects of the present disclosure.

FIG. 14 shows a flowchart illustrating a method 1400 that supports power control for wireless device cooperative transmission schemes in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally, or alternatively, a UE may perform aspects of the functions described below using special-purpose hardware.

At 1405, the UE may communicate with a base station over a first communication link using a set of local antennas associated with a first power class. The communication may involve an exchange of data between the UE and the base station. The operations of 1405 may be performed according to the methods described herein. In some examples, aspects of the operations of 1405 may be performed by a local antenna manager as described with reference to FIGS. 6 through 9.

At 1410, the UE may identify a set of auxiliary antennas of a second device associated with a second power class for transmitting uplink signals to the base station, where the first device is in communication with the second device over a second communication link. The UE may receive configuration information from a wireless device via a modem of the wireless device, and the UE may determine from the configuration information that the wireless device may provide additional antennas to the UE for uplink transmissions to a base station. The operations of 1410 may be performed according to the methods described herein. In some examples, aspects of the operations of 1410 may be performed by an auxiliary antenna manager as described with reference to FIGS. 6 through 9.

At 1415, the UE may transmit, based on identifying the set of auxiliary antennas of the second device, an indication of the second power class for the set of auxiliary antennas to the base station. After determining auxiliary antennas of a wireless device, the UE may transmit a capability indication to a base station indicating that the UE is capable of using antennas associated with different power classes for transmitting uplink signals to the base station. The operations of 1415 may be performed according to the methods described herein. In some examples, aspects of the operations of 1415 may be performed by a power class manager as described with reference to FIGS. 6 through 9.

At 1420, the UE may identify uplink signals to transmit to the base station using at least one antenna of the set of local antennas of the first device associated with the first power class or of the set of auxiliary antennas of the second device associated with the second power class. In some examples, the UE may generate a representation (e.g., IQ samples) of uplink signals for transmission to a base station via auxiliary antennas at the wireless device. The operations of 1420 may be performed according to the methods described herein. In some examples, aspects of the operations of 1420 may be performed by an uplink signal manager as described with reference to FIGS. 6 through 9.

At 1425, the UE may transmit the uplink signals to the base station via the at least one antenna. The UE 115 may transmit the uplink signals using at least one antenna from the set of local antennas at a first transmit power determined in accordance with a first maximum power reduction, a first maximum allowed power, a first transmit power control command, or combinations thereof. The operations of 1425 may be performed according to the methods described herein. In some examples, aspects of the operations of 1425 may be performed by an uplink signal manager as described with reference to FIGS. 6 through 9.

Figure 15:
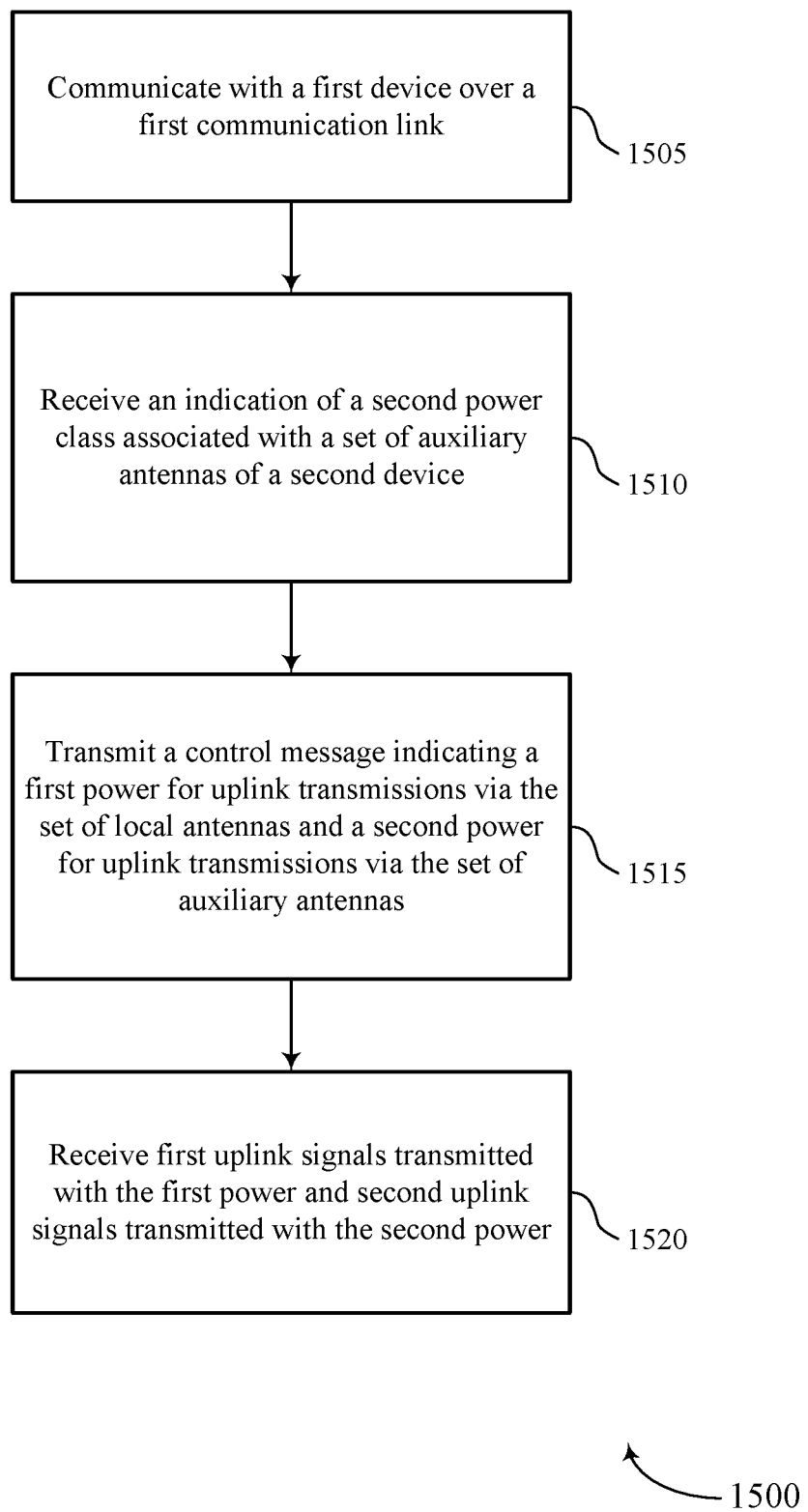

FIG. 15 shows a flowchart illustrating a method 1500 that supports power control for wireless device cooperative transmission schemes in accordance with aspects of the present disclosure. The operations of method 1500 may be implemented by a base station 105 or its components as described herein. For example, the operations of method 1500 may be performed by a communications manager as described with reference to FIGS. 10 through 13. In some examples, a base station may execute a set of instructions to control the functional elements of the base station to perform the functions described below. Additionally, or alternatively, a base station may perform aspects of the functions described below using special-purpose hardware.

At 1505, the base station may communicate with a first device over a first communication link, the first device using a set of local antennas associated with a first power class. The communication may involve an exchange of data between the UE and the base station. The operations of 1505 may be performed according to the methods described herein. In some examples, aspects of the operations of 1505 may be performed by a power class manager as described with reference to FIGS. 10 through 13.

At 1510, the base station may receive, from the first device, an indication of a second power class associated with a set of auxiliary antennas of a second device, where the first device is in communication with the second device over a second communication link. After determining auxiliary antennas of a wireless device, the UE may transmit a capability indication to a base station indicating that the UE is capable of using antennas associated with different power classes for transmitting uplink signals to the base station. The operations of 1510 may be performed according to the methods described herein. In some examples, aspects of the operations of 1510 may be performed by a power class manager as described with reference to FIGS. 10 through 13.

At 1515, the base station may transmit, to the first device, a control message indicating a first power for uplink transmissions via the set of local antennas of the first device and a second power for uplink transmissions via the set of auxiliary antennas of the second device. A UE may receive a control message (e.g., DCI message, RRC message, MAC CE message) from the base station indicating a first transmit power configuration (e.g., maximum power reduction indicator, maximum allowed power) for transmitting uplink signals via the set of local antennas and a second transmit power configuration for transmitting uplink signals via the set of auxiliary antennas. The operations of 1515 may be performed according to the methods described herein. In some examples, aspects of the operations of 1515 may be performed by a transmit power manager as described with reference to FIGS. 10 through 13.

At 1520, the base station may receive first uplink signals from the first device transmitted with the first power and second uplink signals from the second device transmitted with the second power based on the transmitting. The UE 115 may transmit the uplink signals using at least one antenna from the set of local antennas at a first transmit power determined in accordance with a first maximum power reduction, a first maximum allowed power, a first transmit power control command, or combinations thereof. The operations of 1520 may be performed according to the methods described herein. In some examples, aspects of the operations of 1520 may be performed by an uplink signal manager as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first device, comprising:
    communicating with a base station over a first wireless communication link using a set of local antennas associated with a first power class;
    identifying a set of auxiliary antennas of a second device associated with a second power class for transmitting uplink signals to the base station, wherein the first device is in communication with the second device over a second wireless communication link;
    identifying uplink signals to transmit to the base station using at least one antenna of the set of local antennas of the first device associated with the first power class or of the set of auxiliary antennas of the second device associated with the second power class; and
    transmitting the uplink signals to the base station via the at least one antenna.

2. The method of claim 1, further comprising:
    transmitting, based at least in part on identifying the set of auxiliary antennas of the second device, an indication of the second power class for the set of auxiliary antennas to the base station.

3. The method of claim 1, further comprising:
    receiving, from the base station, a first power control command associated with transmitting the uplink signals via the set of local antennas of the first device and a second power control command associated with transmitting the uplink signals via the set of auxiliary antennas of the second device.

4. The method of claim 3, wherein transmitting the uplink signals comprises:
transmitting a first component signal of the uplink signals to the base station via the at least one antenna of the set of local antennas of the first device based at least in part on a first power control loop associated with the set of local antennas of the first device and the first power control command; and
transmitting a second component signal of the uplink signals to the base station via the at least one antenna of the set of auxiliary antennas of the second device based at least in part on a second power control loop associated with the set of auxiliary antennas of the second device and the second power control command.

5. The method of claim 3, further comprising:
transmitting, to the second device over the second wireless communication link, a control message indicating a transmit power for transmitting the uplink signals via the set of auxiliary antennas of the second device.

6. The method of claim 1, wherein transmitting the uplink signals via the at least one antenna of the set of auxiliary antennas of the second device comprises:
sending in-phase and quadrature samples of the uplink signals to the second device for transmission to the base station via the at least one antenna of the set of auxiliary antennas of the second device.

7. The method of claim 1, wherein:
the first power class is applied to antenna ports of the first device associated with the set of local antennas; and
the second power class is applied to antenna ports of the second device associated with the set of auxiliary antennas.

8. The method of claim 1, wherein:
the first power class is applied to a first set of carriers allocated for uplink transmissions from the first device using the set of local antennas; and
the second power class is applied to a second set of carriers allocated for uplink transmissions from the second device using the set of auxiliary antennas.

9. The method of claim 1, further comprising:
receiving radio resource control (RRC) signaling indicating a first maximum power reduction and a first maximum allowed power (PEMAX) associated with the first power class and a second maximum power reduction and a second maximum allowed power (PEMAX) associated with the second power class.

10. The method of claim 1, wherein the second wireless communication link comprises a Bluetooth link, a Wi-Fi link, or a sidelink.

11. A method for wireless communication at a base station, comprising:
communicating with a first device over a first wireless communication link, the first device using a set of local antennas associated with a first power class;
transmitting, to the first device, a control message indicating a first power for uplink transmissions via the set of local antennas of the first device and a second power for uplink transmissions via a set of auxiliary antennas of a second device, wherein the first device is in communication with the second device over a second wireless communication link; and
receiving first uplink signals from the first device transmitted with the first power and second uplink signals from the second device transmitted with the second power based at least in part on the transmitting.

12. The method of claim 11, further comprising:
receiving, from the first device, an indication of a second power class associated with the set of auxiliary antennas of the second device.

13. The method of claim 12, wherein:
the first power class is applied to antenna ports of the first device associated with the set of local antennas; and
the second power class is applied to antenna ports of the second device associated with the set of auxiliary antennas.

14. The method of claim 13, further comprising:
identifying a first antenna port index associated with the first uplink signals and a second antenna port index associated with the second uplink signals; and
determining that the first uplink signals are from the first device based at least in part on the first antenna port index and the second uplink signals are from the second device based at least in part on the second antenna port index.

15. The method of claim 12, wherein:
the first power class is applied to a first set of carriers allocated for uplink transmissions from the first device using the set of local antennas; and
the second power class is applied to a second set of carriers allocated for uplink transmissions from the second device using the set of auxiliary antennas.

16. The method of claim 15, further comprising:
identifying that the first uplink signals are received on the first set of carriers and the second uplink signals are received on the second set of carriers; and
determining that the first uplink signals are from the first device based at least in part on the first uplink signals being received on the first set of carriers and the second uplink signals are from the second device based at least in part on the second uplink signals being received on the second set of carriers.

17. The method of claim 12, further comprising:
transmitting radio resource control (RRC) signaling indicating a first maximum power reduction and a first maximum allowed power (PEMAX) associated with the first power class and a second maximum power reduction and a second maximum allowed power (PEMAX) associated with the second power class.

18. The method of claim 11, wherein the second wireless communication link comprises a Bluetooth link, a Wi-Fi link, or a sidelink.

19. An apparatus for wireless communication at a first device, comprising: a processor, memory coupled with the processor; and instructions stored in the memory and executable by the processor to cause the apparatus to:
communicate with a base station over a first wireless communication link using a set of local antennas associated with a first power class;
identify a set of auxiliary antennas of a second device associated with a second power class for transmitting uplink signals to the base station, wherein the first device is in communication with the second device over a second wireless communication link;
identify uplink signals to transmit to the base station using at least one antenna of the set of local antennas of the first device associated with the first power class or of the set of auxiliary antennas of the second device associated with the second power class; and
transmit the uplink signals to the base station via the at least one antenna.

20. The apparatus of claim 19, wherein the instructions are further executable by the processor to cause the apparatus to:
  transmit, based at least in part on identifying the set of auxiliary antennas of the second device, an indication of the second power class for the set of auxiliary antennas to the base station.

21. The apparatus of claim 19, wherein the instructions are further executable by the processor to cause the apparatus to:
  receive, from the base station, a first power control command associated with transmitting the uplink signals via the set of local antennas of the first device and a second power control command associated with transmitting the uplink signals via the set of auxiliary antennas of the second device;
  transmit a first component signal of the uplink signals to the base station via the at least one antenna of the set of local antennas of the first device based at least in part on a first power control loop associated with the set of local antennas of the first device and the first power control command; and
  transmit a second component signal of the uplink signals to the base station via the at least one antenna of the set of auxiliary antennas of the second device based at least in part on a second power control loop associated with the set of auxiliary antennas of the second device and the second power control command.

22. The apparatus of claim 19, wherein:
  the first power class is applied to antenna ports of the first device associated with the set of local antennas; and
  the second power class is applied to antenna ports of the second device associated with the set of auxiliary antennas.

23. The apparatus of claim 19, wherein:
  the first power class is applied to a first set of carriers allocated for uplink transmissions from the first device using the set of local antennas; and
  the second power class is applied to a second set of carriers allocated for uplink transmissions from the second device using the set of auxiliary antennas.

24. The apparatus of claim 19, wherein the instructions are further executable by the processor to cause the apparatus to:
  receive radio resource control (RRC) signaling indicating a first maximum power reduction and a first maximum allowed power (PEMAX) associated with the first power class and a second maximum power reduction and a second maximum allowed power (PEMAX) associated with the second power class.

25. An apparatus for wireless communication at a base station, comprising: a processor, memory coupled with the processor; and instructions stored in the memory and executable by the processor to cause the apparatus to:
  communicate with a first device over a first wireless communication link, the first device using a set of local antennas associated with a first power class;
  transmit, to the first device, a control message indicating a first power for uplink transmissions via the set of local antennas of the first device and a second power for uplink transmissions via a set of auxiliary antennas of a second device, wherein the first device is in communication with the second device over a second wireless communication link; and
  receive first uplink signals from the first device transmitted with the first power and second uplink signals from the second device transmitted with the second power based at least in part on the transmitting.

26. The apparatus of claim 25, wherein the instructions are further executable by the processor to cause the apparatus to:
  receive, from the first device, an indication of a second power class associated with the set of auxiliary antennas of the second device.

27. The apparatus of claim 26, wherein:
  the first power class is applied to antenna ports of the first device associated with the set of local antennas; and
  the second power class is applied to antenna ports of the second device associated with the set of auxiliary antennas.

28. The apparatus of claim 27, wherein the instructions are further executable by the processor to cause the apparatus to:
  identify a first antenna port index associated with the first uplink signals and a second antenna port index associated with the second uplink signals; and
  determine that the first uplink signals are from the first device based at least in part on the first antenna port index and the second uplink signals are from the second device based at least in part on the second antenna port index.

29. The apparatus of claim 26, wherein:
  the first power class is applied to a first set of carriers allocated for uplink transmissions from the first device using the set of local antennas; and
  the second power class is applied to a second set of carriers allocated for uplink transmissions from the second device using the set of auxiliary antennas.

30. The apparatus of claim 29, wherein the instructions are further executable by the processor to cause the apparatus to:
  identify that the first uplink signals are received on the first set of carriers and the second uplink signals are received on the second set of carriers; and
  determine that the first uplink signals are from the first device based at least in part on the first uplink signals being received on the first set of carriers and the second uplink signals are from the second device based at least in part on the second uplink signals being received on the second set of carriers.

* * * * *